(12) United States Patent
Fuka

(10) Patent No.: US 9,858,828 B1
(45) Date of Patent: Jan. 2, 2018

(54) EXPERT SYSTEMS AND METHODS FOR DYNAMIC ASSESSMENT AND ASSESSMENT AUTHORING

(71) Applicant: Querium Corporation, Austin, TX (US)

(72) Inventor: Kent Allen Fuka, Austin, TX (US)

(73) Assignee: Querium Corporation, Austin, TX (US)

( * ) Notice: Subject to any disclaimer, the term of this patent is extended or adjusted under 35 U.S.C. 154(b) by 0 days.

(21) Appl. No.: 14/210,040

(22) Filed: Mar. 13, 2014

Related U.S. Application Data

(60) Provisional application No. 61/801,445, filed on Mar. 15, 2013, provisional application No. 61/802,215, filed on Mar. 15, 2013.

(51) Int. Cl.
*G09B 7/00* (2006.01)
(52) U.S. Cl.
CPC ..................................... *G09B 7/00* (2013.01)
(58) Field of Classification Search
CPC . G09B 5/00; G09B 19/00; G09B 7/00; G09B 7/02; G06N 5/022
USPC ................. 434/322, 323, 350, 362
See application file for complete search history.

(56) References Cited

U.S. PATENT DOCUMENTS

| | | | | |
|---|---|---|---|---|
| 5,059,127 A | * | 10/1991 | Lewis | G09B 7/00 434/236 |
| 5,259,766 A | * | 11/1993 | Sack | G09B 19/0053 434/323 |
| 6,554,618 B1 | * | 4/2003 | Lockwood | 434/322 |
| 6,634,887 B1 | * | 10/2003 | Heffernan et al. | 434/322 |
| 6,988,895 B1 | * | 1/2006 | Lamarche et al. | 434/323 |
| 9,082,309 B1 | | 7/2015 | Fuka | |
| 2002/0127521 A1 | | 9/2002 | Fegan | |
| 2002/0184265 A1 | | 12/2002 | Gupta | |

(Continued)

OTHER PUBLICATIONS

Ngspice Circuit Simulator—Related Applications, 2 pages, downloaded on Feb. 19, 2013, at http://ngspice.sourceforge.net/relapp.html.

(Continued)

*Primary Examiner* — Sam Yao
*Assistant Examiner* — Jerry-Daryl Fletcher
(74) *Attorney, Agent, or Firm* — Sprinkle IP Law Group

(57) ABSTRACT

Embodiments can provide dynamic assessment by an expert system software (ESS) module. The ESS module may determine a minimum set of diagnostic questions to identify a student's strengths and/or weaknesses for a given subject matter. Each diagnostic question may be a unique question variant generated from a dynamic question template. The ESS module may automatically and dynamically build a personal lesson plan that includes lessons on topics of the subject matter that the student has not mastered. The ESS module may dynamically modify the personal lesson plan to change a lesson and/or add lesson(s) considered by the ESS module as necessary for the student to master the subject matter. Given the ESS module's knowledge on various components of a question such as equation(s) used to produce a correct answer to the question, the ESS module may generate image(s), customized hint(s), customized explanation(s), and/or examine student solutions in step-by-step fashion.

27 Claims, 14 Drawing Sheets

(56) References Cited

U.S. PATENT DOCUMENTS

| | | | | |
|---|---|---|---|---|
| 2004/0091847 | A1* | 5/2004 | Creamer | G09B 7/02 434/353 |
| 2006/0099563 | A1* | 5/2006 | Liu et al. | 434/350 |
| 2006/0199163 | A1 | 9/2006 | Johnson | |
| 2006/0240394 | A1* | 10/2006 | Smith et al. | 434/322 |
| 2006/0286533 | A1* | 12/2006 | Hansen | G09B 7/02 434/323 |
| 2007/0269788 | A1* | 11/2007 | Flowers et al. | 434/350 |
| 2008/0307320 | A1 | 12/2008 | Payne et al. | |
| 2009/0202969 | A1* | 8/2009 | Beauchamp | G09B 7/00 434/335 |
| 2010/0081120 | A1 | 4/2010 | Nanjiani | |
| 2012/0034583 | A1 | 2/2012 | Dujowich et al. | |
| 2013/0084554 | A1 | 4/2013 | Shah et al. | |
| 2013/0196305 | A1 | 8/2013 | Adir et al. | |
| 2014/0024008 | A1* | 1/2014 | Sathy | 434/362 |

OTHER PUBLICATIONS

Mauch, Sean, Welcome page For version 1.9 of Cain—Chemical Simulator, 1 page, Center for Advanced Computing Research, California Institute of Tech., Pasadena, CA, downloaded on Feb. 19, 2013, at http://www.cacr.caltech.edu/~sean/cain/Welcome.htm.
Jones, M. Tim, Open Source Physics Engines, Jul. 7, 2011, 12 pages, IBM Corporation, Armonk, NY, available at http://public.dhe.ibm.com/software/dw/opensource/os-physicsengines/os-physicsengines-pdf.pdf.
MyLabs Plus, MyMathLab and MyStatLab Quick Start Quide for Instructors, Jul. 2012, 32 pages, Pearson Education, Upper Saddle River, NJ, downloaded Mar. 18, 2013, at http://help.pearsoncmg.com/xl/get_started/instructor/mmnd/mml/get_started_instr_mmnd_mml.pdf.
Learn about MathXL, 2012, 1 page, Pearson Education, Upper Saddle River, NJ, downloaded on Mar. 18, 2013, at http://mxlmkt.pearsoncmg.com/learn-about.
MathXL Features, 2008, 3 pages, Pearson Education, Upper Saddle River, NJ, downloaded on Mar. 18, 2013, at http://www.mathxl.com/support/features.htm.
MapleTA, Web-based Testing and Assessment for Math Courses, 2013, 2 pages, Maplesoft, Waterloo, ON, Canada, downloaded on Mar. 18, 2013, available at http://www.maplesoft.com/products/mapleta/.
Maple T.A. User Guide, 2011, 354 pages, Maplesoft, Waterloo, ON, Canada, downloaded on Mar. 18, 2013, at http://www.maplesoft.com/view.aspx?SF=130846/430811/MapleTAUserGuide.pdf.
WebAssign Online Homework and Grading, How it Works, 1 page, North Carolina State University, Raleigh, NC, downloaded on Mar. 18, 2013, at http://www.webassign.net/how_it_works/.
WebAssign Online Homework and Grading, Create Your Own Questions, 1 page, North Carolina State University, Raleigh, NC, downloaded on Mar. 18, 2013, at http://www.webassign.net/features/create_your$_{13}$ own_questions.html.
WebAssign Instructor Guide, Mar. 2013, 516 pages, North Carolina State University, Raleigh, NC, downloaded on Mar. 18, 2013, at http://www.webassign.net/manual/WebAssign_Essentials.pdf.
Wiley PLUS Student User Guide, 32 pages, John Wiley & Sons, Inc., Hoboken, NJ, downloaded on Mar. 18, 2013, at http://www.physics.nus.edu.sg/~phytaysc/pc1221_07/Student%20User%20Guide.pdf.
Wiley PLUS Creating Your Own Questions, 1 page, John Wiley & Sons, Inc., Hoboken, NJ, downloaded on Mar. 18, 2013, at http://www.wiley.com/college/twomin/ins/addingquestions.html.
Wiley Plus Instructor User Guide, 39 pages, Wiley Plus, downloaded on Mar. 18, 2013, at http://lrdudc.wrlc.org/cat/quick-guides/wiley-plus.pdf.
What Makes ALEKS Unique, 2012, 9 pages, ALEKS Corporation, Irvine, CA, downloaded on Mar. 18, 2013, at http://www.aleks.com/about_aleks/What_Makes_ALEKS_Unique.pdf.
Respondus 4.0 User Guide for Platform-Neutral Personality, Mar. 2010, 46 pages, Respondus, Inc., Redmond, WA, downloaded on Mar. 18, 2013, at http://www.respondus.com/downloads/Respondus40UserGuidePN.doc.
EdReady, Powered by NROC, 2013, Monterey Institute for Technology and Education, downloaded on Mar. 11, 2014 at http://edready.org/.
ALEKS—Assessment and Learning, K-12, Higher Education, Automated Tutor, Math, downloaded on Mar. 11, 2014, at http://www.aleks.com/.
MathXL Highlights, Rotating Content, 2008, 2 pages, Pearson Education, Upper Saddle River, NJ, downloaded on Mar. 11, 2014, at http://www.mathxl.com/.
MyLab and Mastering, MyMathLab, 5 pages, Pearson Education, Upper Saddle River, NJ, downloaded Mar. 11, 2014, at http://www.pearsonmylabandmastering.com/northamerica//index.html.
Quest Learning & Assessment, 2014, 1 page, The University of Texas at Austin, College of Natural Sciences, Austin, Texas, downloaded Mar. 11, 2014, at https://quest.cns.utexas.edu/.
Office Action for U.S. Appl. No. 14/209,855, dated Nov. 20, 2014, 26 pgs.
Office Action for U.S. Appl. No. 14/209,855, dated May 20, 2014, 15 pgs.
Office Action for U.S. Appl. No. 14/209,855, dated Sep. 18, 2014, 27 pgs.
Notice of Allowance for U.S. Appl. No. 14/209,855, dated Mar. 26, 2015, 4 pgs.
Sebrechts, Marc M. et al., A Research Platform for Interactive Performance Assessment in Graduate Education, Apr. 1993, GRE Board Report No. 90-01P, Educational Testing Service, Princeton, NJ, 89 pgs.

* cited by examiner

FIG. 7

Edit Question 2

Welcome, Kent Fuka    Logout

Home > Kent's Questions > Edit Question

Question T...
A(n) Vehic
City2, trav...
Vehicle le...
If the distan...
time do the...

Multiple Choice ▼
4 ▼

Manage Distractors

Edit Question #?? ✕

Object Inspector:City

Object Name: NorthAmericanMajorCity
Parent Class: City

Instances

| Atlanta |
| Boston |
| Chicago |
| Cleveland |
| Dallas |
| Denver |
| Detroit |

702

| Property Name | Property Type | Value |
|---|---|---|
| Elevation | Real | 131 m |
| Founding Year | Integer | 1841 |
| Latitude | Latitude | 32.7828 N |
| Longitude | Longitude | 96.8039 W |
| MaxAnnualAverageTemperature | Real | 35.5 C |
| MinAnnualAverageTemperature | Real | 3.8 C |

Question V...

| Name |
| City |
| Distance |
| StartTime |
| Vehicle |
| Velocity |

| | Operation | Item B |
|---|---|---|
| City2 | >= | 500 km |
| | RoundTo | 0 |
| Velocity | >= | 100 km/h |
| | DivisibleBy | 5 km/h |

Solution E...
Solution =

Generated...
A bus leav...
At the sam...
If the distan...
(to the nea...
☑ A: 7:...

Show Me Another Example

Cancel    Save

0/0 Comments  OFF

FIG. 8

STATIC VARIANT #1
PROBLEM STATEMENT: A NEIGHBORHOOD REC CENTER HAS A BASKETBALL COURT THAT IS 84 FEET LONG AND 50 FOOT WIDE, THE CENTER WANTS TO BUILD A SECOND BASKETBALL COURT, BUT SPACE IS LIMITED. IF THEY BUILD A BASKETBALL COURT THAT IS 43 FEET WIDE, HOW MANY FEET LONG MUST IT BE SO IT IS SIMILAR IN SHAPE TO THE ORIGINAL BASKETBALL COURT? ROUND YOUR ANSWER TO THE NEAREST TENTH OF A FOOT.
SOLUTION VALUE: 72.2 FEET
DISTRACTOR #1 VALUE: 83.1 FEET
DISTRACTOR #2 VALUE: 77.0 FEET
DISTRACTOR #3 VALUE: 97.7 FEET
CORRECT ANSWER EXPLANATION: SIMILAR FIGURES HAVE THE SAME RATIO FOR EACH PAIR OF CORRESPONDING SIDES. MAKE A RATIO OF THE TWO WIDTHS $\frac{43}{50}$, AND MULTIPLY THIS BY THE LENGTH, 84 FEET, IN ORDER TO DETERMINE HOW LONG THE SMALLER SIMILAR COURT MUST BE.

DISTRACTOR #1 EXPLANATION: YOU DID NOT USE THE RATIO CORRECTLY. INSTEAD OF SUBTRACTING IT FROM THE LENGTH OF THE FULL COURT, YOU SHOULD MULTIPLY THE RATIO AND THE LENGTH OF THE FULL COURT.

DISTRACTOR #2 EXPLANATION: YOU MUST FIND THE RATIO OF THE WIDTHS, WHICH INVOLVES DIVIDING THE SMALLER WIDTH BY THE LARGER AND MULTIPLYING BY THE LENGTH, NOT ADDITION AND SUBTRACTION.
DISTRACTOR #3 EXPLANATION: THE RATIO YOU NEED IS $\frac{43}{50}$, BUT YOU INCORRECTLY USED THE INVERSE. THE LENGTH OF THE PRACTICE COURT NEEDS TO BE SMALLER THAN THE LENGTH OF THE ORIGINAL COURT.

GENERAL HINT #1 EXPLANATION: DETERMINE THE RATIOS OF THE WIDTHS AND THE LENGTHS.
GENERAL HINT #2 EXPLANATION: DOES YOUR ANSWER MAKE SENSE? IS THE LENGTH OF THE PRACTICE COURT SMALLER THAN THE LENGTH OF THE ORIGINAL COURT?

STATIC VARIANT #2
PROBLEM STATEMENT: A NEIGHBORHOOD REC CENTER HAS A BASKETBALL COURT THAT IS 84 FEET LONG AND 50 FEET WIDE. THE CENTER WANTS TO BUILD A SECOND BASKETBALL COURT, BUT SPACE IS LIMITED. IF THEY BUILD A BASKETBALL COURT THAT IS 39 FEET WIDE, HOW MANY FEET LONG MUST IT BE SO IT IS SIMILAR IN SHAPE TO THE ORIGINAL BASKETBALL COURT? ROUND YOUR ANSWER TO THE NEAREST TENTH OF A FOOT.
SOLUTION VALUE: 65.5 FEET
DISTRACTOR #1 VALUE: 83.2 FEET
DISTRACTOR #2 VALUE: 73.0 FEET
DISTRACTOR #3 VALUE: 107.7 FEET

Algebra Review: Simplifying Expressions — Querium

Simplify the Expression: $\dfrac{10x^6 + 8x^4}{2x^2}$   1110 — "One of your 'X' coefficients is incorrect."   1102

Enter your work step by step, and I'll check it for you. Click 'Show Me a Hint' whenever you need help.

| | | |
|---|---|---|
| Step #1 | (10*x^6 + 8*x^4)/(2*x^2) | Correct! |
| Step #2 | (10*x^6)/(2*x^2) + (6*x^4)/(2*x^2) | Not Quite |
| Step #3 | | |
| Step #4 | | |

1104

Pick your final answer here:
- A: $9x^{12}$
- B: $14x^4$
- C: $5x^4 + 4x^2$
- D: $5x^3 + 2x^2$

1106

[ My Dashboard ]   [ Show Me Another Hint ]   [ Grade This Question ]

Algebra Review: Simplifying Expressions     Querium

Simplify the Expression: $\dfrac{10x^6 + 8x^4}{2x^2}$     1102

Enter your work step by step, and I'll check it for you. Click 'Show Me A Hint' whenever you need help.

| Step #1 | (10*x^6 + 8*x^4)/(2*x^2) | Correct! |
|---|---|---|
| Step #2 | (10*x^6)/(2*x^2) + (8*x^4)/(2*x^2) | Better! |
| Step #3 | (10*x^(6 - 2))/2 + 4*x^(4 - 2) | You Rock! |
| Step #4 | 5*x^4 + 4*x^2 | Fantastic! |

1104

Pick your final answer here:
- A: $9x^{12}$
- B: $14x^4$
- C: $5x^4 + 4x^2$
- D: $5x^3 + 2x^2$

1106

( My Dashboard )  ( Show Me A Hint )~1107  ( Grade This Question )

EXPERT SYSTEMS AND METHODS FOR DYNAMIC ASSESSMENT AND ASSESSMENT AUTHORING

CROSS-REFERENCE TO RELATED APPLICATIONS

This patent application is a conversion of and claims a benefit of priority from U.S. Provisional Applications No. 61/801,445, filed Mar. 15, 2013, entitled "EXPERT AGENTS FOR DYNAMIC TEST AUTHORING" and No. 61/802,215, filed Mar. 15, 2013, entitled "EXPERT ASSESSMENT AUTHORING SYSTEM AND ARCHITECTURE." This patent application also relates to U.S. patent application Ser. No. 14/209,855, filed Mar. 13, 2014, entitled "DYNAMIC QUESTION TEMPLATE SYSTEM AND ARCHITECTURE," which is a conversion of and claims a benefit of priority from U.S. Provisional Application No. 61/794,703, filed Mar. 15, 2013, entitled "DYNAMIC QUESTION TEMPLATE SYSTEM AND ARCHITECTURE." All applications listed in this paragraph are hereby incorporated by reference in their entireties for all purposes as if fully set forth herein.

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

TECHNICAL FIELD

This disclosure relates generally to online education software and services. More particularly, embodiments disclosed herein relate to expert systems and methods for dynamic assessment and assessment authoring. Even more particularly, embodiments disclosed herein relate to a system, method, and computer program product for the assessment of students through online systems for self-practice, homework, quizzes, exams and certification tests, useful for educational testing, professional certification exams, and student practice systems.

BACKGROUND

Modern online assessment systems need to generate a plurality of similar, unique questions for multiple students both to reduce the possibility of cheating when students share answers to questions and to provide a basis for student drilling or practicing.

To create the plurality of unique question variants, online assessment systems require that question authors generate a question template from which a plurality of similar, unique question variants can be produced. This question authoring effort can lead to large amounts of programming effort on the part of question authors as well as requiring substantial subject matter expertise. For problems that involve real-world information, this programming task can be even more complicated due to the need for a question template to include a wide variety of real-world data necessary to produce the plurality of unique questions. Previous solutions required a question author to create each question template from scratch. Multiple question templates could not share a common library of code, or a common library of real-world facts and information.

Previous online assessment systems that do not employ templates require a large number of very similar unique static questions, with one similar static question chosen at random to be delivered to a student taking an assessment test. In any case, a question author (who authors question templates or static questions) had to copy and paste a large amount of logic and data between similar static questions or question templates.

Previous solutions required question authors to generate several pieces of information within each question template, including some or all of the following:
  The text of the question.
  A list of variable pieces of information within the question.
  A set of constraints on each of the variables (e.g., integer values in the range −5 to +5, or a letter from the set ['x','y','z']).
  One or more equations or other means to determine the correct answer to the question for each unique question variant generated by selecting random values for the variables that meet all of the constraints.
  If the question is a multiple choice question, some means of specifying possible false answers ('distractors') for the unique question variants.
  Descriptive text or explanation text displayed when a correct answer is given.
  Descriptive text or explanatory text displayed when an incorrect answer is given.
  One or more hints that could be provided to a student on request, or that could be provided automatically if the student provides an incorrect answer to the question.
  One or more graphics and/or images that help explain the question.

In previous systems, all of these pieces of information were provided by question authors through some manual process. Specifically, several current products include manual methods for a question author to specify the variable information within a question template and to specify the constraints on each variable. This requires that the question author specifies these variables to the testing system, and for each variable sets one or more constraints so that each variable will only generate unique values that satisfy this constraints. This is a labor-intensive task for a question author who is creating a large number of question templates. Although some expert system or artificial intelligence (AI) techniques may be used to help instructors select questions, to help a software system automatically grade assessments (e.g., homework, quizzes, tests, exams, etc.), or to help students with expert-based dynamic tips, question/test authoring remains a mostly manual task for question authors.

SUMMARY OF THE DISCLOSURE

Embodiments disclosed herein provide expert systems and methods that can intelligently assist users such as students in answering questions and progressing in their individual learning paths and can intelligently assist users such as question authors and instructors in creating assessment questions. Particularly, embodiments disclosed herein include many innovative and useful features including, but are not limited to:
  Given a set of mathematical questions that describe a problem in science, technology, engineering or math, an expert system software (ESS) tool or module may suggest and/or generate a number of questions that could be used to demonstrate mastery of those equations.

Given a component of a dynamic question template (DQT) being composed by a question author, an ESS module may suggest text or image for the component or automatically generate the component for the question author.

By examining the text of a question and the equation(s) that generate the correct solution, an ESS module may identify one or more elements of the question that could be converted into DQT variables.

By examining information with the question, and the type and number of DQT variables, an ESS module may suggest possible DQT variable constraints that would generate the number of unique question variants (UQVs) desired by the DQT author.

Given the text of the question, an ESS module may suggest possible equations to generate the correct answer to the equation from a library of existing equations, based on keywords in the question, or other facts inferred from the other DQT components.

Given the desire to create plausible distractors for a multiple-choice question, an ESS module may use a set of desirability fit criteria to create variants of the correct-answer equations to produce plausible incorrect answers (distractors).

Given knowledge of the equations that produce the correct answer, an ESS module may generate explanation text based on the elements of those equations.

Given knowledge of the other components of the question, of the differences between the equation that generates the correct answer and the equations that generate incorrect multiple choice questions, or knowledge of any incorrect steps by which the student generated their incorrect answer to the question, or external factors such as a given students history of answering previous questions, an ESS module may generate a customized explanation for the student when they provide an incorrect answer.

Given knowledge of the other components of the question, of the differences between the equation that generates the correct answer and the equations that generate incorrect multiple choice questions, or knowledge of the steps by which the student generated their answer to the question, or external factors such as a given students history of answering previous questions, an ESS module may generate a customized hint for the student.

Given the equations used to produce the correct answer, plus knowledge of other components of the DQT, an ESS module may suggest or generate a customized or uncustomized image to accompany the question. A customized image could include specific information for the DQT variables with their unique values for the UQV.

In some embodiments, the ESS module may utilize an object library framework and may implement rule based ESS algorithms. Some embodiments may implement ESS algorithms based on other types of artificial intelligence such as fuzzy logic systems, neural networks, Bayesian networks, etc.

In some embodiments, a method for dynamic assessment may include receiving, by an ESS module running on a computer having a processor and a memory, an indication of a subject matter on which to perform an assessment of a student; determining a minimum set of diagnostic questions to identify the student's strengths, weaknesses, or both strengths and weaknesses relative to the given subject matter, each of the minimum set of diagnostic questions is a unique question variant generated from a dynamic question template; administering the diagnostic questions to the student over a network; automatically and dynamically building a personal lesson plan for the student, the personal lesson plan including a set of lessons, each relating to a topic on the subject matter that the student has not mastered; and presenting the personal lesson plan to the student on a client device communicatively connected to the computer over a network connection. In some embodiments, the method may further comprise dynamically modifying the personal lesson plan to change a lesson and/or add lesson(s) considered by the ESS module as necessary for the student to master the subject matter. In some embodiments, the administering the diagnostic questions to the student may include, given an equation or equations used to produce a correct answer to a first diagnostic question of the diagnostic questions, the ESS module generating an image and presenting the image with the first diagnostic question to the student. The image may be customized or uncustomized based on the first diagnostic question.

One embodiment comprises a system for dynamic assessment. The system comprises a processor and a non-transitory computer-readable storage medium that stores computer instructions translatable by the processor to perform a method substantially as described herein. Another embodiment comprises a computer program product for dynamic assessment. The computer program product comprises a non-transitory computer-readable storage medium that stores computer instructions translatable by a processor to perform a method substantially as described herein.

Numerous other embodiments are also possible.

Embodiments disclosed herein can provide many advantages. For example, embodiments can streamline question authoring and save time for question authors by reducing the amount of information and/or the complexity of the logic they must include in their question templates. Suggestions can be made that enforce an organization's question style across multiple question authors collaborating on a question library. All of these advantages can save time for question authors, and help improve the quality of their work. For Instructors, embodiments can improve the selection of assessment questions, and could provide intelligent feedback to instructors to improve their teaching, their instructional content, and/or their assessments. Additionally, embodiments can improve algorithmic exercise processes. For example, individualized lesson plans may be created based on individual students' learning paths. When appropriate, hints can be provided to students. Moreover, embodiments may adapt to a student's progress and dynamically change how an assessment is conducted. Embodiments may generate and/or update answers appropriate to a particular question. Furthermore, embodiments may provide a testing system based on touch-drawn answers or gestures, drastically improving the ease-of-use.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 7 depicts a graphical user interface including objects for composing dynamic question templates;

FIG. 8 depicts an example html preview of generated questions;

FIG. 11A-FIG. 11E illustrate example hints to student users according to some embodiments;

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
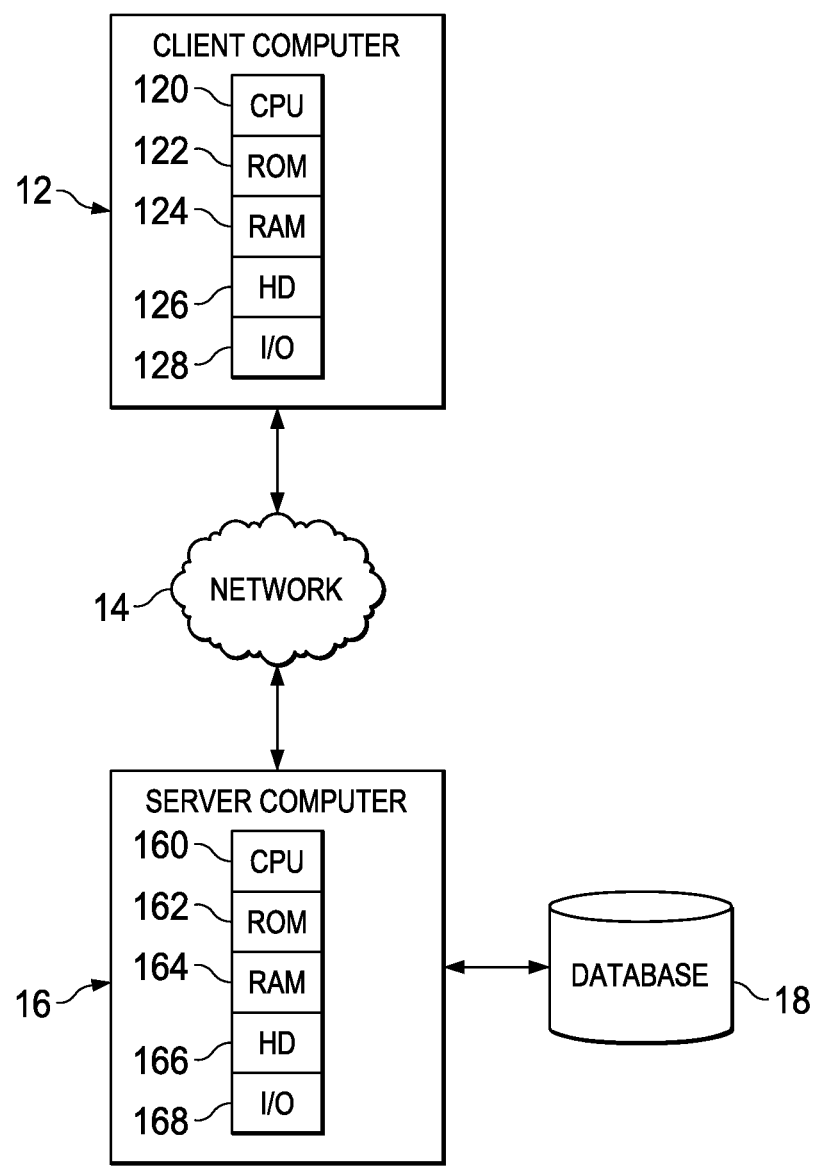
FIG. 1 depicts an example of a hardware architecture where embodiments disclosed herein can be implemented.

Before discussing example embodiments of the invention, a hardware architecture where embodiments disclosed herein can be implemented is described. FIG. 1 illustrates an exemplary architecture and includes a client computer 12 that is bi-directionally coupled to a network 14, and a server computer 16 that is bi-directionally coupled to the network 14 and database 18. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O devices 128 can include a keyboard, monitor, printer, electronic pointing device (e.g., mouse, trackball, etc.), or the like. The server computer 16 can include a CPU 160, ROM 162, RAM 164, HD 166, and I/O 168 similar to corresponding items in client computer 12.

Each of the client computer 12 and the server computer 16 is an example of a data processing system. ROM 122 and 162, RAM 124 and 164, HD 126 and 166, and the database 18 include media that can be read by the CPU 120 or 160. Therefore, each of these types of memories includes a data processing system readable medium. These memories may be internal or external to the computers 12 and 16.

The client computer 12 may be a personal computer, tablet computer, smart phone or other user device. In various embodiments, a client computer 12 may be employed by a DQT author, an instructor, or a student. In particular, as will be explained in greater detail below, a client computer 12 may be used by a DQT author or instructor to generate question templates in accordance with embodiments. A client computer 12 may likewise be used by an instructor to or administrator to administer an exercise system. Finally, a client computer 12 may be utilized by a student to perform exercises.

In various embodiments, the server computer 14 may be a premises-based server computer or may be one or more cloud-based computers and may implement an exercise system and/or dynamic exercise middleware. As will be explained in greater detail below, the database 18 may store questions, templates, records of student responses, and the like.

Figure 2:
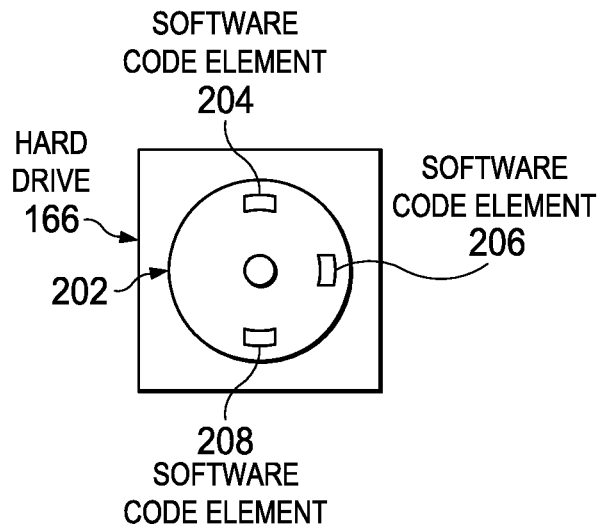
FIG. 2 depicts a diagrammatic representation of software code elements stored on an example non-transitory computer readable medium.

The methods described herein may be implemented in suitable software code that may reside within ROM 122 or 162, RAM 124 or 164, or HD 126 or 166. In addition to those types of memories, the instructions in an embodiment of the invention may be contained on a data storage device with a different data processing system readable storage medium. FIG. 2 illustrates a combination of software code elements 204, 206, and 208 that are embodied within a data processing system readable medium 202 on HD 166. Alternatively, the instructions may be stored as software code elements on a DASD array, magnetic tape, floppy diskette, electronic read-only memory, optical storage device, CD ROM or other appropriate data processing system readable medium or storage device.

Server machines like the server computer 16 described above may be used to implement an assessment system and client devices like the client computer 12 may be used by question authors to create questions or question templates for such an assessment system, by instructors to create tests, and by students to perform exercises and take tests.

Figure 3:
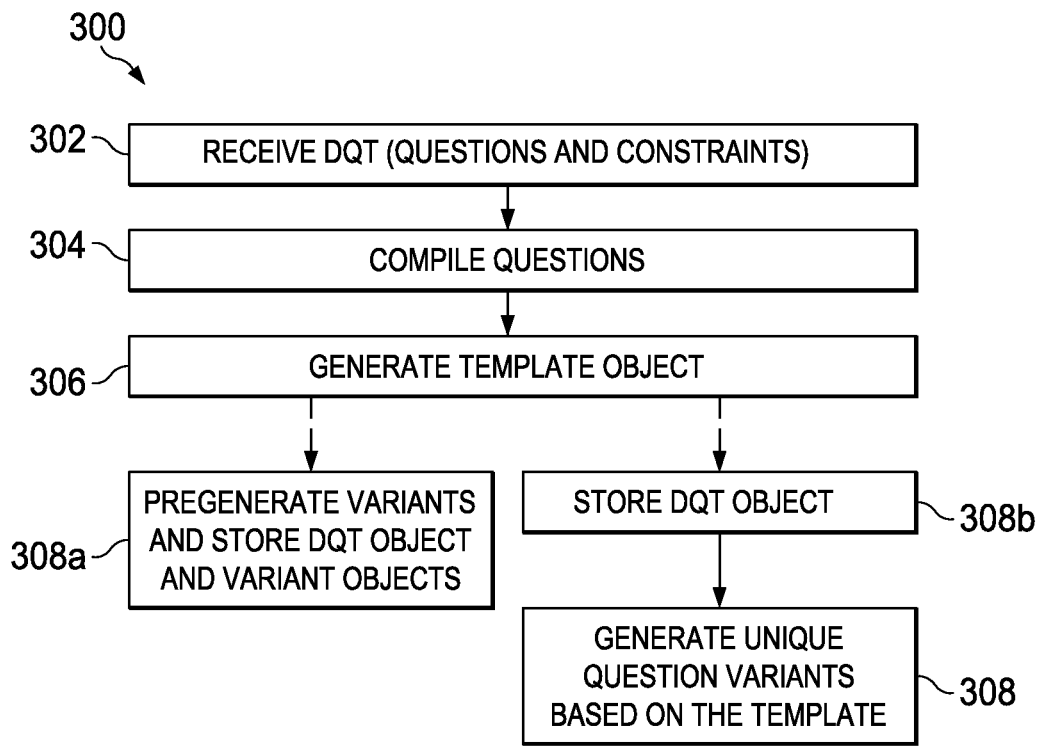
FIG. 3 depicts a flowchart illustrating operation of embodiments.

Turning now to FIG. 3, a flowchart illustrating operation of embodiments is shown and generally identified by the reference numeral 300. As shown, one or more questions, variables, and associated variable constraints of a Dynamic Question Template may be received at a computer such as server computer 16, typically over a network such as network 14 (step 302). As will be explained in greater detail below, in some embodiments, the Dynamic Question Template may be written in a Query Specification Language (QSL) and may be composed, for example, in a text editor or through use of a graphical user interface (GUI) by a user of a computer such as client computer 12. Depending on the embodiment, the Dynamic Question Template may then be checked, e.g., for syntax, and compiled and converted into internal formats, e.g., a machine-readable format or language used by a symbolic math engine such as Mathematica (step 304). Once this is done, the compiled question and constraints may be converted into a corresponding Dynamic Question Template object (step 306). In some embodiments, the DQT object can include one or more predefined objects, such as commonly-used equation objects, from an object library. In some embodiments, generating the DQT object can include determining if the constraints are reasonable or whether they will produce a reasonable number of unique question variants. In addition, some embodiments may suggest changes or other enhancements to the question. Depending on the embodiment, the process may proceed to process steps 308a or 308b. In step 308a, unique question variants are generated and stored in an object library (as will be discussed in greater detail below), either with or without the DQT object itself. Thus, in such an embodiment, one or more UQVs are pre-generated and easily accessible to a user. In other embodiments, however, the DQT object only is stored in the object library (step 308b). In this case UQVs may be generated on the fly at runtime based on the DQT object (step 308).

Figure 4:
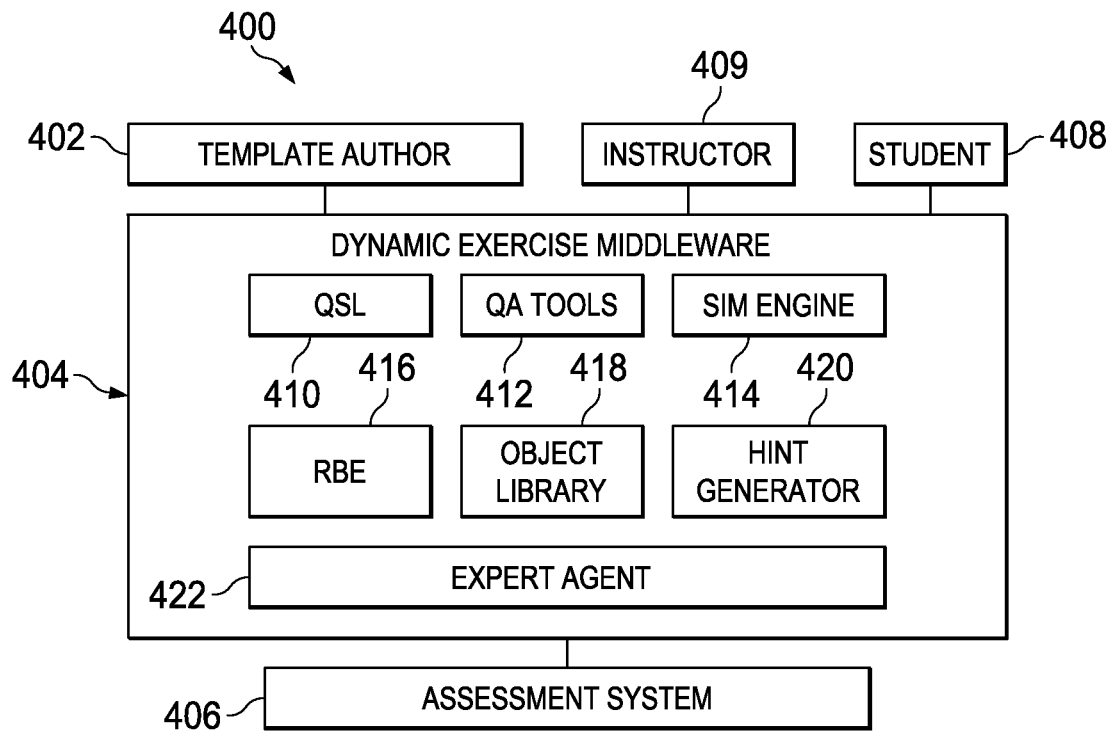
FIG. 4 depicts a diagrammatic representation of a dynamic question template system and architecture with object libraries

As illustrated in FIG. 4, a DQT author 402 may use the dynamic exercise system or dynamic exercise middleware (DEM) 404 to generate questions that are used by an assessment or dynamic exercise system 406 to present questions or exercises to a student user 408. The student user 408 of an assessment system (AES) 406 may undergo an online assessment by accessing the assessment system 406 via the dynamic exercise system 404 and answering a set of questions. Finally, an instructor 409, who may also be an author 402, may utilize the dynamic exercise system 404 to provide homework assignments, quizzes, and tests based on questions and exercises.

Embodiments may provide a middleware system and architecture that can decouple question authors from algorithmic assessment systems, freeing question authors from having to know various programming and formatting languages required by assessment systems. In one embodiment, the DEM 404 may include one or more translators and corresponding application programming interfaces (APIs) configured to communicate with various programming and formatting languages used by the dynamic exercise system 406. The DEM 404 may be communicatively connected to one or more internal and/or external data sources, as further described in detail below. The DEM 404 may provide a user interface (UI). A user (e.g., the DQT author 402, the instructor 409, the student 408, etc.) may access the assessment system 406 via a UI.

As mentioned above, in order to reduce the possibility of cheating when students share answers to questions, an online assessment system needs to generate a plurality of similar, unique questions. Such questions are similar and unique in that no two Unique Question Variants (UQVs) are identical to one another and yet they may follow the same or similar pattern or be generated from the same template. These unique question variants can allow the assessment system to test multiple students in a similar manner while reducing the possibility of cheating.

To create a plurality of unique question variants (UQVs), a DQT author 402 has to generate a question template from which the plurality of UQVs can be produced. Previous solutions required a question author to create each question template from scratch. Multiple question templates did not share a common library of embedded code. Question authors often have to embed several different specifications with a single question. For example, specification of the mathematics embedded in a question in Mathematica, may be in a different representation than specification of logic statements controlling the generation of the values in a unique question variant written in Perl. Furthermore, the representation for the formatting of a question on a user's screen or on a printed examination would require the knowledge of yet another special formatting language such as HTML or LaTeX. Advantageously, according to embodiments, a QSL is provided comprising a single question specification language, which removes from the Question Author the need to learn multiple languages like HTML or Mathematica in order to author questions.

In accordance with embodiments, a question template (DQT) created by a DQT author 402 can be evaluated by the DEM 404 to generate unique question variants. The DEM 404 may include one or more software modules that may enhance the question author's ability to build templates and author questions. These modules may include one or more of a Query Specification Language (QSL) 410, Quality Assurance Tools 412, Simulation Engines 414, Rules based Systems Engines 416, Object Library 418, and Hint Generation 420.

As will be discussed in greater detail below, the Query Specification Language module 410 supports a language that allows for authoring of questions and defining constraints. A resulting compiled question then specifies a template that may then be used for the generation of unique question variants based on the constraints.

The Quality Assurance Tools 412 assist in the generation of a question by checking to see if the question and specified constraints will generate a reasonable number of questions and also have reasonable answers.

The Simulation Engines 414 may be used to run simulations of the questions (e.g., equations) entered, for example, in a math system like Mathematica or MAPLE, or in a circuit simulator like Spice].

The Rules Based System Engine (RBE) 416 may analyze the state of the running system and, through subject matter knowledge of a tutor or an instructor, may be used to control the operations of other elements of the system. For example, the RBE 416 may perform step-by-step analysis of student work on a question in the system, or may offer praise to the student if they are making good progress on the last few questions, or encouragement to the student to keep trying if they have been struggling on the last few questions.

The Object Library 418 may be a predetermined or preloaded library of objects comprising DQT objects, UQV objects, as well as common questions or equations that a question author may access for easier generation of questions. Those skilled in the art will appreciate that objects stored in Object Library 418 may vary from implementation to implementation. For example, for any subject area in which an assessment system will be used, Object Library 418 may include objects which are typically used in questions in that subject area. As a specific example, for an assessment system for college electrical engineering, an embodiment of Object Library 418 may include objects which represent electronic components (e.g., resistors, capacitor, batteries, diodes, etc.), digital logic elements (e.g., AND gates, OR gates, NOR gates, flip-flops, etc.), and basic circuit elements (e.g., bridge circuits, amplifier circuits, etc.). A DQT author wishing to write questions for an electrical engineering question about calculating the resistance of a series of resistors can make use of the resistor object in the library, which is in turn capable of calculating the resistance of a series of resistors. In this way, the DQT author can easily create a DQT which can generate a wide variety of unique questions about series resistance without having to program the correct calculation of series resistance within the DQT, or within a number of similar DQTs.

Hint Generator 420 may suggest to authors ways to obtain additional variants of questions or ways to make questions harder or easier to solve. The Hint Generator 420 may also offer hints to instructors on how to create better tests by combining questions. In addition, the Hint Generator 420 may also offer hints to students who need help with a question. Hints for students may be either stored by the question author within a DQT, or could be generated by the Hint Generator 420 on the fly based on the state of the system.

The Expert Agent(s) 422 may interact with the other modules of the DEM 404 to enhance the user (question author, instructor, student, etc.) experience. For example, some embodiments make intelligent decisions, e.g., on question quality, on step-by-step evaluation of student work on a question, for instructors in selecting questions to make up an exam, etc.

The DEM 404 may be implemented in various ways. The DEM 404 can operate in between template authors 402, students 408, and assessment system 406. The DEM 404 can simplify the work of a DQT author 402. For example, traditionally, to create an algorithmic exercise, a question author would write the question text, determine the variables, determine the variable constraints, write the equations which determine the correct answer for the question, and perhaps write one or more incorrect 'distractor' answers. With the DEM 404, a DQT author 402 may only need to write the question text or direct the DEM expert agent 422 to generate the question text. The rest of the functions can be performed by the DEM 404. Specifically, as an example, the DEM 404 may operate to perform determining and suggesting variables in a dynamic question template, determining and suggesting appropriate constraints for those variables, providing correct equation(s) to solve the question, and automatically generate distractors equation(s) when appropriate.

In one embodiment, the DEM 404 can dynamically determine or recognize a variable as a DQT author 402 is typing in the question text. In some embodiments, the DEM 404 may highlight a word, suggesting that the lighted word may be a variable. Appropriate constraints for that variable may be determined and displayed to the DQT author 402. This can save time for the DQT author. The DEM 404 can dynamically show a question generated from the DQT that the DQT author 402 is working on and allow the DQT author 402 to view a unique question variant (UQV) by a single click of a button. In some embodiments, the DEM 404 treats each variable as an object. Consequently, the DEM 404 can allow the DQT to call an object inspection tool and view attributes of the object (e.g. vehicle maximum velocity in a physics question).

Example DEM features and components will now be described in detail below.

Advantageously, the DEM 404 may mask the complexity of an underlying assessment system (e.g., AES 406), an underlying symbolic math system, and/or other simulation systems (e.g., Simulation Engines 414). More particularly, there is a steep learning curve for new DQT authors to learn the features of an AES or symbolic math system used in previous solutions. By masking the complexity of the underlying proprietary system, the DEM 404 can allow a much wider set of people to author DQTs, due to the reduced need to learn specialized programming languages (e.g., Mathematica, Maple, SAGE, etc.) and data formatting languages (e.g., HTML, MathML, XML, LaTeX, etc.). By providing an intuitive, streamlined method of specifying math equations inside the DEM 404, the DQT author 402 can become effective sooner. The DEM 404 can translate the DQT's mathematics into whichever computer math system languages are required by the underlying AES. Similarly, a DQT author 402 may want to specify details of the formatting of the generated questions. Previously, this specification might require the DQT author 402 to learn and master one or more data formatting languages. By providing a generic means for formatting the generated UQVs, the DEM 404 can avoid the problem of having the DQT author 402 learn special formatting languages or tools.

In addition, by performing convenience operations within the DEM 404, embodiments reduce the number of operations a DQT author must perform in order to create or modify a DQT. The DEM 404 can provide the equivalent of a macro-operation, which allows the DQT author to perform a set of operations over a large set of questions. For example, if a DQT author 402 needs to modify 150 DQTs so they use metric units rather than English units, a component could store a sequence of modifications to one DQT as a macro, which the author could then perform across the other 149 DQTs automatically. Similarly, a common equation library (CEL) component of the object library 418 could store libraries of frequently-used equations such as Maxwell's Equations (differential equations of electrodynamics) so that these equations can be referred to across a large number of DQTs without the need to separately copy/paste the differential equations into each DQT.

The QA Tools 412 perform quality assurance tests on the DQT to flag potential errors in the DQT to the DQT author 402. Thus, embodiments can reduce the number of errors created in DQTs. This can further reduce student frustration and reduce instructor time examining assessment results that have possibly erroneous scores.

Additionally, since one goal of a DQT is to generate a variety of UQVs, the DEM 404 can assist the DQT author 402 by estimating the number of UQVs that can be generated from a given DQT based on the number of variable constraints defined within the DQT. The DEM 404 can also provide graphical visualization aides to help the DQT author 402 understand the multi-dimensional space that represents the population of UQVs which can be generated from the DQT, given the currently-defined variable constraints. For example, if the problem is over-constrained, there may not be many UQVs generated. If the problem is under-constrained, there may be unintended or erroneous UQVs created, which result in students being presented questions that allow for wrong answers to be treated as correct, or correct answers to be treated as incorrect.

In some embodiments, the DEM 404 can also generate samples of the UQVs to estimate the runtime required to generate a UQV. Since it is desirable to generate UQVs 'on the fly', a set of calculations that take several seconds to generate would result in an assessment system 406 performance for students that was unacceptably slow. Finally, the DEM 404 can offer debugging features that allow a DQT author 402 to determine what aspect of a faulty DQT specification produced an erroneous UQV.

The hint generator 420 may provide hints to DQT authors 402 on various ways to improve their DQTs. By providing hints to the DQT author 402, embodiments can assist DQT authors to create better assessment questions, particularly for novice DQT authors. Specifically, the DEM 404 may operate to examine the equation(s) embedded within a DQT and suggest more efficient ways of specifying those equations to reduce the system load and runtime required to generate a UQV from the given DQT. The DEM 404 could also examine the text of the question within a DQT and suggest ways to reword the question to match an assessment style guide. For example, the DEM 404 could indicate that too few female names are being used within a library of DQTs compared with the number of male names being used. The DEM 404 could also enforce a given output question style, for example by enforcing the requirement that all math variables that appear in a question be formatted in italics.

In some embodiments, the libraries, such as Object Library 418 may allow DQT authors to conveniently search through libraries of DQT components. Embodiments can save time for DQT authors by reducing the amount of new code they need to develop within a DQT and reduce the amount of duplicate code that must be replicated within a number of related DQTs.

Because most technical questions involve the use of math to answer the question, a DQT author 402 may need to embed within a DQT the equation(s) required to calculate the correct answer to the question. By storing a library 418 of previously-entered formulas, the DEM 404 can allow the DQT author 402 to search for the formulas they need, possibly save the DQT author 402 the time of re-entering the formulas themselves.

Whenever a DQT author 402 needs to enter a formula into an equation, embodiments of the DEM 404 may offer the DQT author 402 the option of adding that formula into the library for future re-use by other DQT authors. For example, the DEM 404 could provide a library of electrical circuits for use in questions involving electrical circuits, or a library of chemical structures for questions involving chemistry. The DEM 404 could also allow a DQT author 402 to select graphical images to include within the DQT, when the DQT needs to refer the student to an image to explain the problem being addressed in the question. This image library may function like a clip-art library for use by question authors. The DEM might also embed graphics editing tools so that the DQT author could modify the image to suit the needs of their specific DQT. Just as a library of formulas or images, formulas, circuits, chemicals, etc. could be used to assist the DQT author, a library of rules for the generation of false answers in multiple-choice questions (known as 'distractors') could assist the DQT author in creating multiple-choice questions. A library of pre-defined hints or explanation text might assist the DQT author in creating hints or explanations within DQTs. A library of pre-defined constraint values could also assist the DQT author. For example, if a variable named 'WaterTemperature' is defined within a DQT, the DEM might suggest that a good range for that variable constraint might be from 32 degrees to 212 degrees Fahrenheit.

In some embodiments, the simulation engine 414 allows a DQT author to easily and conveniently access more than one simulation system. The DEM 404 can be configured to support multiple symbolic math systems such as those discussed above, as well as software simulation tools or engines such as Spice, ANSYS, etc. to assist in the programming of DQTs and the grading of the resulting UQVs that are generated by the AES. This allows the DEM 404 to utilize the best features of each tool within a single DQT and reduce possible logic errors. For example, instead of programming all of the electrical equations required to create a DQT concerning a student's ability to measure the voltage difference between two given points within an electrical circuit, the DQT can refer to a circuit simulation software package that calculates the correct answer, saving the programmer from having to embed math formulas that already exist within the circuit simulation tool.

In some embodiments, an expert agent 422 may be provided that may interact with one or more of the other modules to assist in authoring questions and, in some embodiments, assist in converting pre-existing "static" questions into DQVs in accordance with embodiments. In particular, the expert agent 422 may interact with the hint generator 420 and the rules-based engine 416 to provide hints or variants based on an examination of one or more questions and/or constraints input by the user.

For example, the expert agent 422 may examine a static question and suggest elements of the question that might be made into question variables. In some embodiments, the expert agent 422 is configured to parse the text of a question (including for example any mathematical equations or chemical formulae they contain), and identify elements of the question that might be transformed into variable information within the question.

In some embodiments, the expert agent 422 is configured to parse a set of natural language elements. An expert system based on the rule-based-engine 416 or other technique(s) may examine the information within a question and suggest one or more elements of the question that could be converted from a constant into a variable. The DQT author 402 could then check off one or more of the suggested changes, and the testing system would then create a variable element in the DQT. In some embodiments, the expert agent 422 is configured to suggest reasonable values for the constraints on a DQT variable. In some embodiments, the expert agent 422 is configured to offer potential formulas for determining the correct answer to the DQT question, based on a knowledge base of math, science, and engineering subjects. For creating DQTs for multiple-choice questions, in some embodiments, the expert agent 422 is configured to suggest frequently-made student errors as the source of potential wrong answers to the question (e.g., forgetting a negative sign within a calculation, or performing math operations in the wrong order, etc.). The expert agent 422 might also suggest editorial changes to the question wording, or to ensure consistency of wording, grammar, etc. across a set of related DQTs, or enforce a 'style guide' for DQTs.

The QSL interface 410 provides a generic representation to interface DQT components and hides the underlying syntax of multiple DQT representations. The QSL interface 410 allows an underlying DQT component to be replaced without requiring that all DQTs that used the old component to be modified to use the specification language required by the replacement component.

Additionally, the QSL interface 410 can free an application developer from needing to learn and use multiple proprietary specification languages in order to access the underlying AES features. For example, the DEM 404 can be configured to convert the text representation of a math equation in QSL into an internal representation used by a symbolic math engine like Mathematica or Maple. More specifically, by writing DQTs to a generic 'meta' interface rather than to the specific proprietary representations, the providers of an assessment system 406 incorporating an embodiment of the DEM 404 can choose to replace underlying components without requiring that all DQTs that reference those components be modified.

It is not necessarily a requirement of the DEM 404 that the DQT author write all of their questions explicitly using QSL as a 'programming language'. As will be discussed in greater detail below, the user interface can be graphical, wizard-based, menu-based, etc., and use QSL as an internal representation that is partially or fully invisible to a DQT author. The QSL can act as an intermediate representation of the question, and then an embodiment of the DEM 404 can include translator(s) to translate this internal QSL representation into whatever proprietary representation is required by the tools within the assessment system 406. For example, a math formatting declaration defined in QSL could be translated into MathML, or into LaTeX as needed. However, internally the question can be stored within the DEM 404 in a more portable, generic format of QSL. If an assessment system 406 needs to import a large number of existing questions via the DEM 404, those questions could be externally produced in QSL as text, and that text file could be easily imported into the DEM 404 and stored without a large amount of further manual processing.

Figure 5:
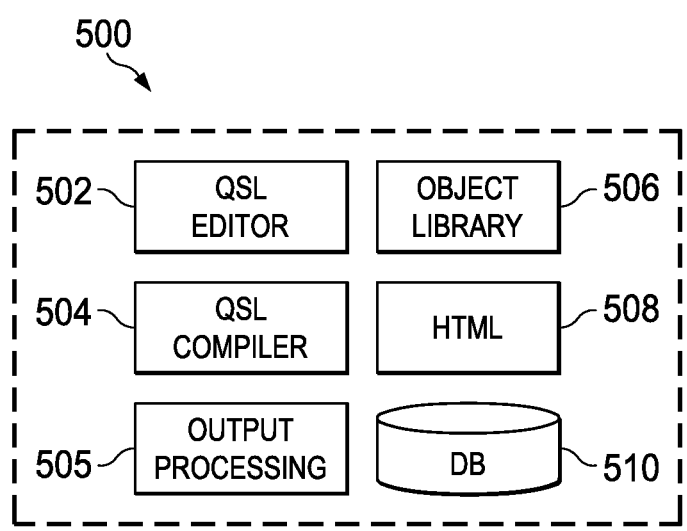
FIG. 5 depicts a diagrammatic representation of an integrated development environment.
Figure 6:
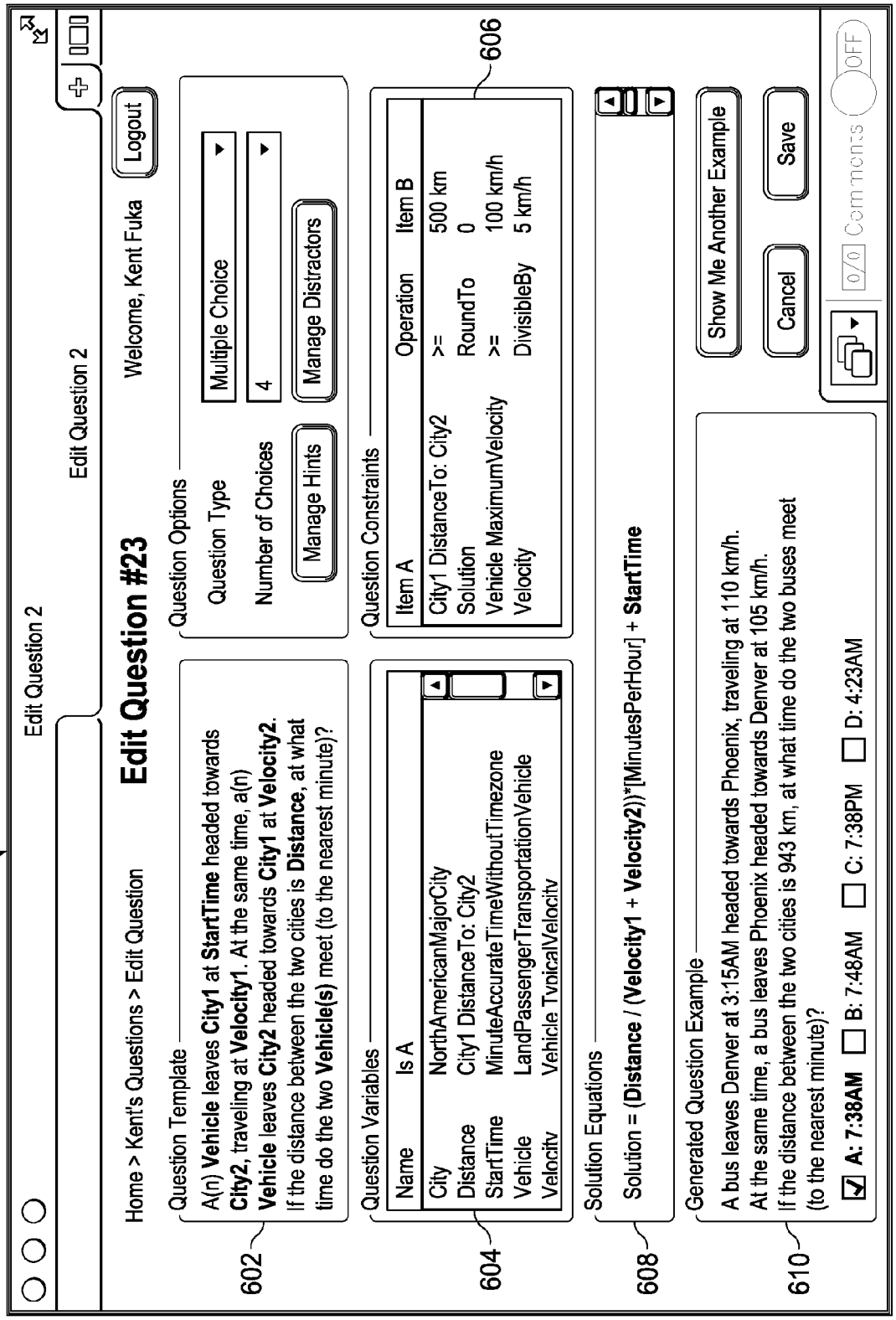
FIG. 6 depicts an example of a graphical user interface for composing dynamic question templates.

FIG. 5 schematically illustrates an integrated development environment 500 for question authoring and template generation using a Query Specification Language in accordance with embodiments. As shown, the integrated development environment 500 includes a QSL editor 502 for receiving questions including related constraints authored by an author. In some embodiments, the QSL editor 502 may include a graphical user interface (GUI) that includes a question authoring wizard and other components. For example, shown in FIG. 6 is a user interface 600 that may allow a user to generate a question. In the example illustrated, the interface 600 includes question template 602, variables 604, and constraints 606. Solution equations 608 and a generated question example 610 are also shown.

Similarly, the interface of FIG. 7 shows an example of an object 702 that can be used in the generation of the question of FIG. 6. In the example illustrated, the object is a "city" object and can include various properties that may be useful in generating questions or variants and constraints. In other embodiments, the QSL editor 502 may comprise a text editor capable of receiving user-authored questions and constraints directly in the Query Specification Language.

An example of a query in the QSL is set forth below:
question $Q000012;
setting $version "1.4";
variable $width integer;
variable $format1 string;
variable $format2 string;
variable $format3 string;
variable $format4 string;
variable $solution real;
variable $distractor1 real;
variable $distractor2 real;
variable $distractor3 real;
constraint $width {$width >=38; $width <=48;};
solution correct_answer {$solution=$format1;};
solution distractor1 {$distractor1=$format2;};
solution distractor2 {$distractor2=$format3;};
solution distractor3 {$distractor3=$format4;};
language "eng";
statement "A neighborhood rec center has a basketball court that is 84 feet long and 50 feet wide. The center wants to build a second basketball court, but space is limited. If they build a basketball court that is $width feet wide, how many feet long must it be so it is similar in shape to the original basketball court? Round your answer to the nearest tenth of a foot.";
explanation correct_answer
"Similar figures have the same ratio for each pair of corresponding sides. Make a ratio of the two widths $M[$width/50], and multiply this by the length, 84 feet, in order to determine how long the smaller similar court must be.";
explanation distractor1
"You did not use the ratio correctly. Instead of subtracting it from the length of the full court, you should multiply the ratio and the length of the full court.";
explanation distractor2
"You must find the ratio of the widths, which involves dividing the smaller width by the larger and multiplying by the length, not addition and subtraction.";
explanation distractor3
"The ratio you need is $M[$width/50], but you incorrectly used the inverse. The length of the practice court needs to be smaller than the length of the original court.";
explanation general_hint1
"Determine the ratios of the widths and the lengths.";
explanation general_hint2
"Does your answer make sense? Is the length of the practice court smaller than the length of the original court?";
explanation format1
"$Meval[(84)*($width/50)*1.0] feet";
explanation format2
"$Meval[((84)−($width/50))*1.0] feet";
explanation format3
"$Meval[(($width)+(84−50))*1.0] feet";
explanation format4
"$Meval[(84)*(50/$width)*1.0] feet";
tags {"similar figures", "rectangle", "ratio", "proportions"};
end_language;
end_question;

The QSL compiler 504 parses the entered query and performs constraint processing on the query. The compiler 504 may also translate the query into a Mathematica or other suitable language format.

The output processor 505 may receive the resulting compiled query as well as objects from the object library (if any) and generate an html output 508 as well as a an output, e.g., in JSON format, to database 510. The html output may be used by an author to review the question, while the JSON output may be stored as the template in the database 510.

FIG. 8 is an example of an html preview according to an embodiment. In the example illustrated, two question variants are shown, along with associated correct answers and distractors. An example of a corresponding JSON output is provided in the above-referenced U.S. patent application Ser. No. 14/209,855, filed Mar. 14, 2014, entitled "DYNAMIC QUESTION TEMPLATE SYSTEM AND ARCHITECTURE," which is incorporated by reference herein.

Figure 9:
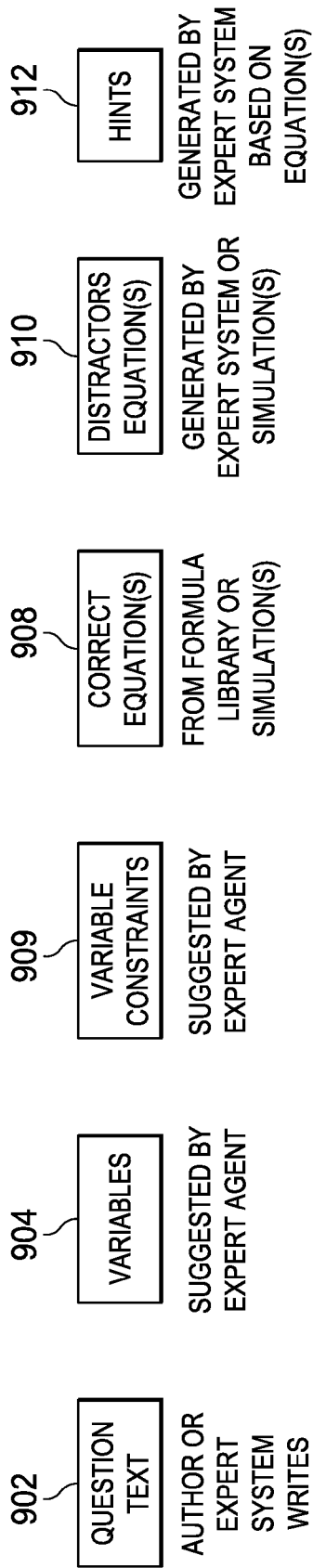
FIG. 9 depicts a diagrammatic representation of expert agent usage in template and question development.

As noted above, in some embodiments, the DEM 404 may include or implement an expert agent 422 that interacts with other elements of the DEM 404 to assist in authoring questions. As illustrated in FIG. 9, having an intelligent agent 422 assist with any or all of these steps can represent a time savings (and probably a cost savings) for the DQT author. For example, as set forth below, the expert agent 422 may estimate the number of unique values for all of the constraint variables in a question, e.g., if the question has two constrained variables $var1 and $var2:

constraint $var1 {$var1>=1; $var1<=15;};
constraint $var2 {$var2 >=1; $var2<=15, $var1!=$var2;};
The system will display something like this:
Approximate number of possible values for each variable:
$var1: 15
$var2: 15
Approximate number of variants: 210

For example, as shown at 902, a question author may write a question using the QSL as set forth above. Alternatively, the DEM 404 may be used to scan in a previously written static question and analyzed using the expert agent 422. For example, according to embodiments, the expert agent 422 could assist with recognizing the form of a question given in a source representation, e.g., recognizing that the question is a multiple-choice question, or a fill-in-the blank question. While part of this problem can be address using an Optical Character Recognition (OCR) engine, the higher-level of understanding of the question text requires separating math equations, chemical symbols, charts and graphs, and other question elements from the basis textual part of the question. The expert agent 422 can be configured to take the output of an OCR engine, and identify the components of the question, saving the DQT author from having to specify each portion of the question.

In some embodiments, an expert agent 422 can be configured to convert the text representation of a math equation into an internal representation used by a symbolic math engine like Mathematica or Maple. In some embodiments, the expert agent 422 can be configured to identify a chemical symbolic representation and convert it into an internal representation used by other Chemistry-specific software components in the testing system.

Figure 10:
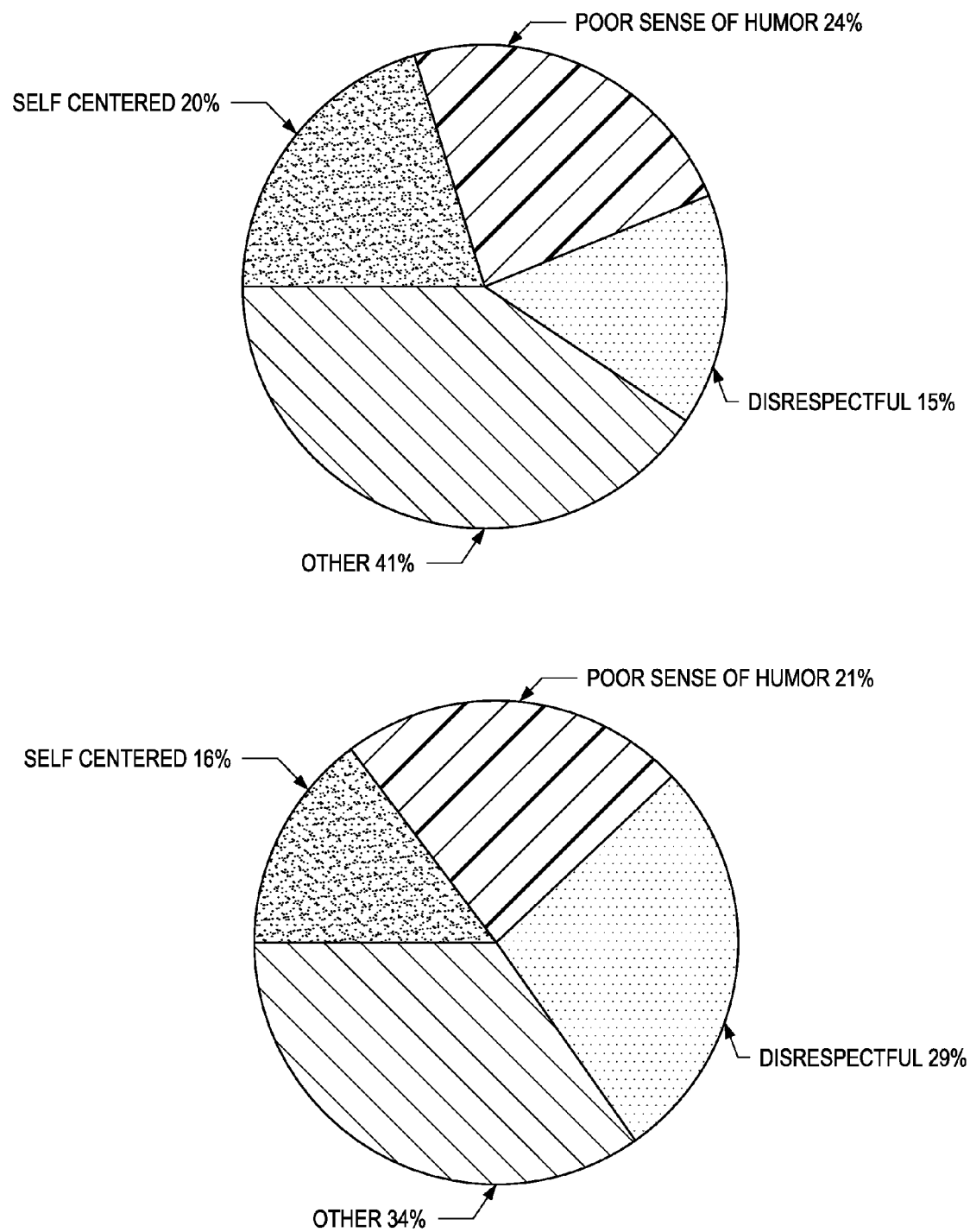
FIG. 10 illustrates example pie charts generated using QSL according to some embodiments.

In some embodiments, an expert agent can be configured to examine charts and graphs in their digital state (e.g., a bitmap image) and recognize the labels on the axes of the charts, which would assist the DQT author if the chart must be re-generated for each unique question variant of a DQT. In some embodiments, the expert agent may generate a unique chart for a UQV using variables specified in the DQT, e.g., a pie chart where the size of the piece slices vary according to variables within the question template. Examples of exemplary pie charts are shown in FIG. 10. QSL language for generating the example of FIG. 10 is set forth below:
question $Q000164;
variable $var integer;
variable $selfcenter integer;
variable $humor integer;
variable $disrespectful integer;
variable $other integer;
variable $solution integer;
constraint $var {$var >=4; $var <=14;};
constraint $selfcenter {$selfcenter>=15, $selfcenter<=30;};
constraint $humor {$humor >=15, $humor<=30, $humor!=$selfcenter;};
constraint $disrespectful {$disrespectful>=15, $disrespectful<=30,
    $disrespectful!=$selfcenter, $disrespectful!=$humor;};
constraint $other {$other=100−$selfcenter−$disrespectful−$humor,
    $other!=$selfcenter, $other!=$disrespectful,
    $other!=$humor;};
solution correct_answer {$solution=$var*$selfcenter;};
language "eng";
statement "$Graph[PieChart] A group of one hundred teenagers at the mall were surveyed and asked what annoyed them the most about their best friends. The results are shown in the pie chart. If the group of one hundred was a sample from a town with $Meval[$var*100] total teenagers, predict what total number of teenagers are likely to be most annoyed by self-centeredness.";
graphic_variables PieChart {$selfcenter,$humor,$disrespectful,$other};
graphic_legends PieChart {
    "Self-centered",
    "Poor sense of humor",
    "Disrespectful",
    "Other"};
end_language;
end_question;

The appearance of the $Graph[PieChart] in line 19 determines where the graphic named PieChart is displayed within the generated Unique Question Variants. In this case the graphic is displayed as part of the question's problem statement. In other uses, a graphic might be displayed within a multiple-choice answer or within an answer explanation or a hint. The line that begins 'graphic_variables' specifies which DQT variables are to be included in the pie chart, and in which order. Finally, the section that begins with 'graphic_legends', defines the text displayed for each segment of the pie chart.

Returning to FIG. 9, as shown at 904, in some embodiments, the expert agent 422 can be configured to examine the internal representation of a math equation and suggest which elements of the equation might be converted into a variable in the DQT. For example, when presented with a formula like $f(x)=6x^2+4x-8$, the expert agent 422 could identify that 'x' might be a variable element (which might be varied to 'y' or 'z', etc.), and that '6', '2', '4' and '8' might each be varied by the DQT. The expert agent 422 could also identify that the '+' and the '−' in the formula could be switched from '+' to '−', and vice versa. Thus, a variant of the DQT might become $f(y)=8y^4-2y+4$, if all elements of the equation were made variable. The DQT author 402 would then merely need to check-off which subset of these formula elements they wish to become variables in the final DQT, or they might allow the expert agent to pick some subset of the possible variables (e.g., pick 2 elements to vary, and leave the other elements unchanged in the DQT.)

In some embodiments, the expert agent 422 can be configured to examine the internal representation of a chemical equation, or a physics equation, or an engineering equation, and suggest elements which might be modified. For example, in a pre-existing (static, non-DQT) physics question involving 5 newtons of force, an expert agent might suggest that the '5' become a variable, and that the constrained range of that variable be from 1 newton to 10 newtons.

As shown at 906, when DQT authors 402 are writing new dynamic questions from scratch, they can enter their equation in some simple format (e.g., from a keyboard), and the expert agent 422 can be configured to highlight those elements of the equation that might be considered to be a variable element as the author is typing. More specifically, the expert agent 422 may parse the question 'on the fly' as it is being entered, attempt to recognize the various elements of the question and, where appropriate, dynamically propose improvements and/or suggest variable elements.

When questions are multiple choices, the DQT author 402 may need to specify how the testing system calculates the correct answer, and may specify ways to generate false answers (known as distractors). In some embodiments, a pre-defined object library 908 of math, science, and engineering equations can simplify this process for a DQT author. However, a trained question author may employ some techniques to generate plausible distractors as some or all of the 'distractor' wrong answers for a multiple choice question. In some embodiments, the expert agent 422 can be configured to mimic the work of a trained question author by employing common student faults to generate plausible wrong answers, as shown at 910. Such an expert agent would know, for example, that students often perform operations in an equation in the wrong order, and would operate to make those same errors to generate a synthetic wrong answer. In some cases, the expert agent 422 may make use of the knowledge contained in the math, science and engineering object library of equations 418 to generate synthetic wrong answers by applying the wrong equation to solve a problem. The expert agent 422 may also miss-convert units like mass, velocity, temperature, etc. to generate a synthetic 'distractor' answer with the wrong units of measure. Finally, when generating multiple choice answers, the expert agent 422 could constrain the possible correct and incorrect answers within a range of answer lengths, for example, so that the correct answer is not significantly longer/shorter than or more-complex/less-complex than the alternative answers.

In some embodiments, the expert agent 422 can be configured to act as a trained question editor, enforcing a library of style rules for DQTs. For example, as shown at 912, a DQT editor expert agent 422 may interact with the hint generator 420 to suggest clearer question wording, or provide hints about providing a correct answer. As a specific example, an expert agent 422 may be configured to remind a DQT author 402 that the question should tell the student to round their answer appropriately, or to include the units of measure in their answer.

In some embodiments, the expert agent 422 can be configured to act as a style guide. When multiple question authors are collaborating on a set of DQTs, such a style guide expert agent may enforce organization rules, e.g., about the selection of names in word problems (Mary, John, Jose, Shamiquah, etc.) to avoid gender bias, economic bias, racial bias, as well as question phrasing rules (e.g., use of 'shall', 'must', 'should', etc.).

In some embodiments, the expert agent 422 can be configured to detect instances of question plagiarism or excessive similarity. For example, when a DQT author authors a question, an expert agent 422 may search existing stocks of questions and notify the DQT author (or their management) about other questions that already contain largely the same information.

In some embodiments, an expert agent 422 can be configured to act as an expert editor for human DQT authors. In some embodiments, an expert agent (or a collection of expert agents) may be configured to completely automate the transformation of existing static questions (perhaps scanned from existing textbooks or sample printed exams) into fully-dynamic DQTs without human intervention.

In some embodiments, the expert agent 422 may be given access to a library of equations for a math, science, engineering or technology knowledge base (e.g., the object library described herein) and generate a set of DQTs (or static questions) automatically to determine a student's mastery of the knowledge represented by those equations. For example, given the knowledge of the equations behind Isaac Newton's first law of motion, the expert agent 422 may generate a variety of questions that, when answered correctly, will demonstrate that student's knowledge and understanding of Newton's first law of motion. Various expert agents 422 can be configured to generate a variety of question types, including true/false, multiple-choice, fill-in-the-blank, short answer, and graphical questions (like 'draw a plot diagram' questions), etc.

In some embodiments, for both DQT authors 402 and students 408 using the resulting variable questions generated from a DQT, an expert agent 422 could be configured to work out the steps required to solve a multiple step solution to one or more related questions, and assist in generating and grading questions that require students to show their work. This would allow the expert agent to give DQT authors and students immediate feedback on whether the sequence of steps in their work is correct.

In some embodiments, an expert agent could be configured to assist in the generation and grading of problems involving logic proofs. Proofs are used throughout higher mathematics, geometry, and logic courses. An expert agent configured with the knowledge of logic rules (e.g., formal logic rules taken from the field of discrete mathematics) could assist in the generation of DQTs, and could grade student questions that involve proof steps. Mathematical logic is an example type of formal logic—a subfield of mathematics exploring the applications of formal logic to mathematics. Mathematical logic is often divided into set theory, model theory, recursion theory, and proof theory. Proof problems often involve logical operators and logic rules. Examples of logical operators include AND ($\wedge$), IF, THEN, NOT, OR (v), and XOR. Examples of logic rules include simplification, conjunctive addition, disjunctive addition, double negation, etc. An expert agent configured with the knowledge of logic rules may assist in generating DQTs for problems that involve proof steps. For example, a proof problem may be as follows:

Premise 1: A $\wedge$ B
Premise 2: C
Using the premises in 1 and 2, prove that a conclusion (A $\wedge$ C) is true.

An expert agent may suggest or generate a correct answer using simplification and conjunctive addition logic rules in a 2-step proof as follows:
Step 1: Apply the simplification logic rule to premise 1 to get A.
Step 2: Apply the conjunctive addition logic rule to step 1 and premise 2 to get (A $\wedge$ C).

In some embodiments, for instructors creating homework sets, quizzes, exams and high-stakes tests (collectively known as Assessments), an expert agent could be configured to help an instructor select questions that demonstrate mastery of a particular set of equations, concepts and knowledge rules.

In some embodiments, for instructors teaching a large number of students (e.g., in a Massive Open Online Course [MOOC]), an expert agent could be configured to review student correct and incorrect answer across an entire class section, all class sections, or across multiple institutions, and offer suggestions for improvement to teaching, or improvements to assessment questions.

In some embodiments, for instructors creating an adaptive learning path through the subjects covered by their course, an expert agent could be configured to analyze the material presented (e.g., topics or full text), and the DQT assessment questions used, and could help build a course workflow that maximized quality (e.g., shortest path for student mastery, incomplete assessment of all topics (test coverage), elimination of redundant topics or redundant assessment questions, automatic generation of knowledge pre-requisites, etc.). For example, if a physics course requires calculus, a physics DQT that requires a knowledge of integration-byparts to solve, could be linked to a math topic that explains techniques for doing integration by parts, or could offer up a question that demonstrates that the student understands how to do integration-by-parts prior to showing the student the physics module that requires this knowledge.

In some embodiments, for students answering assessment questions, an expert agent could be configured to review their work and their answers, and suggest dynamic assistance (e.g., hints, help, prerequisite remedial lessons, etc.) based on the details of the variable question the student is answering. In some embodiments, the expert system may interface to a third-party lesson recommendation engine like Knewton. Existing systems offer only general tips when students get answers wrong, and these are normally static text. An expert agent-based system could offer dynamic hints that incorporate variable information, and which are based a particular rules base. For example, if an expert agent determines that a student has answered a question incorrectly because at one step of their calculation they forgot a minus sign, the expert agent could offer a reminder to check their minus signs in, say, Step #4. Similarly, if the system determined that the student used seconds rather than hours to calculate a problem involving time, the expert agent could offer the student a unique hint to check their units of measurement of time.

For many instructors and educational publishers, there is a desire for testing solutions that require students to 'show their work'. While it is possible for systems to record a student's intermediate work in arriving at an answer, an expert agent could be configured to evaluate the steps involved in the intermediate work and quickly identify any missteps prior to the student entering their final answer. This can help students avoid incorrect answers, and help instructors automate the grading of student work that contains intermediate steps. Because the expert agent has access to a symbolic math engine and other simulation tools, the expert agent can use this expert knowledge to evaluate the intermediate steps of a solution and determine whether each step N is correct given the prior steps.

Figure 11A:

An example of this is shown with reference to FIG. 11A-FIG. 11E. Shown in FIG. 11A is an interface 1100 showing an example question 1102 requiring the student to simplify an algebraic expression. In the example illustrated, the interface 1100 includes a solution entry section 1104, a final answer selection section 1106, and a hint request control 1107.

Figure 11B:
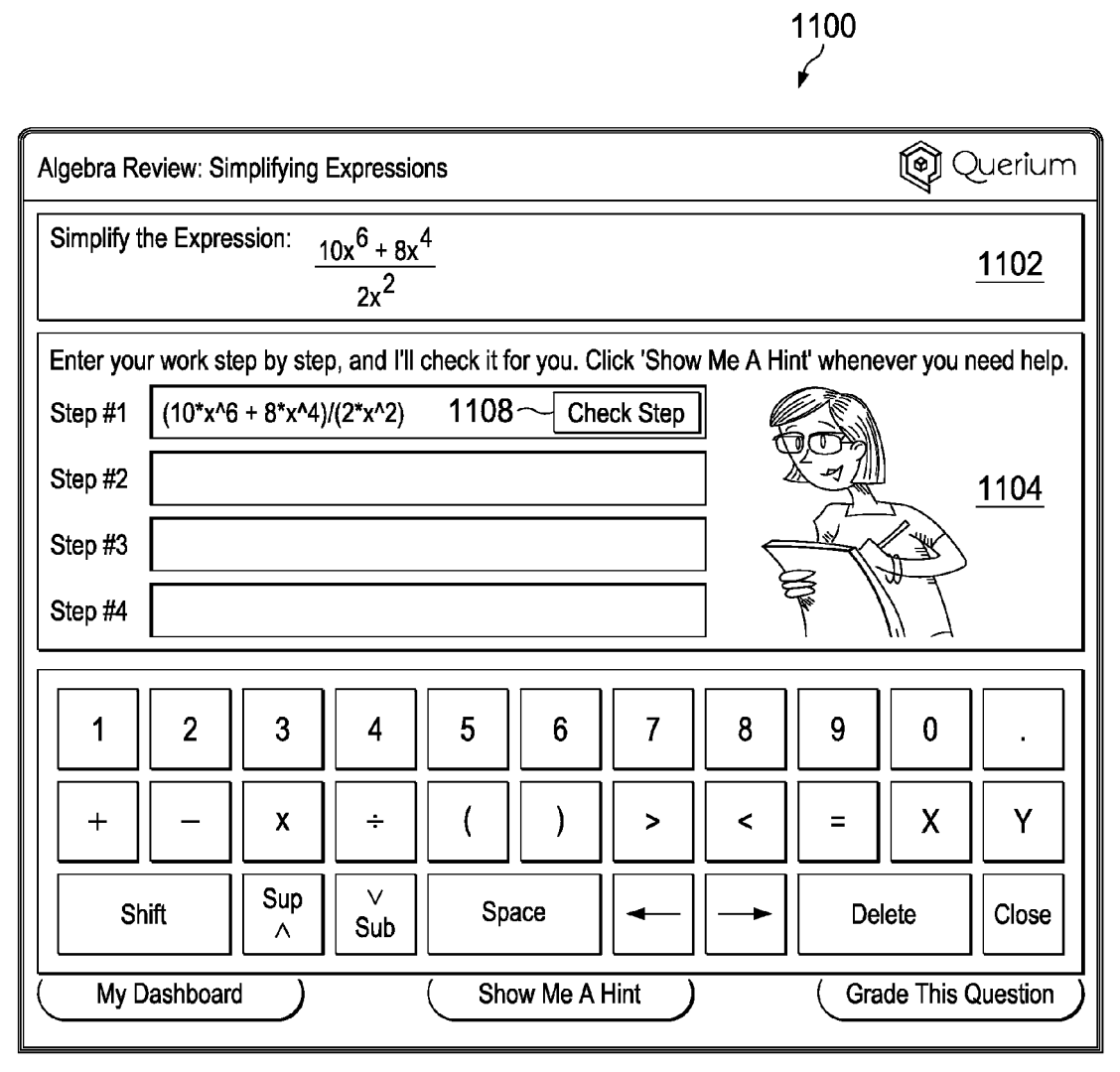
Figure 11C:
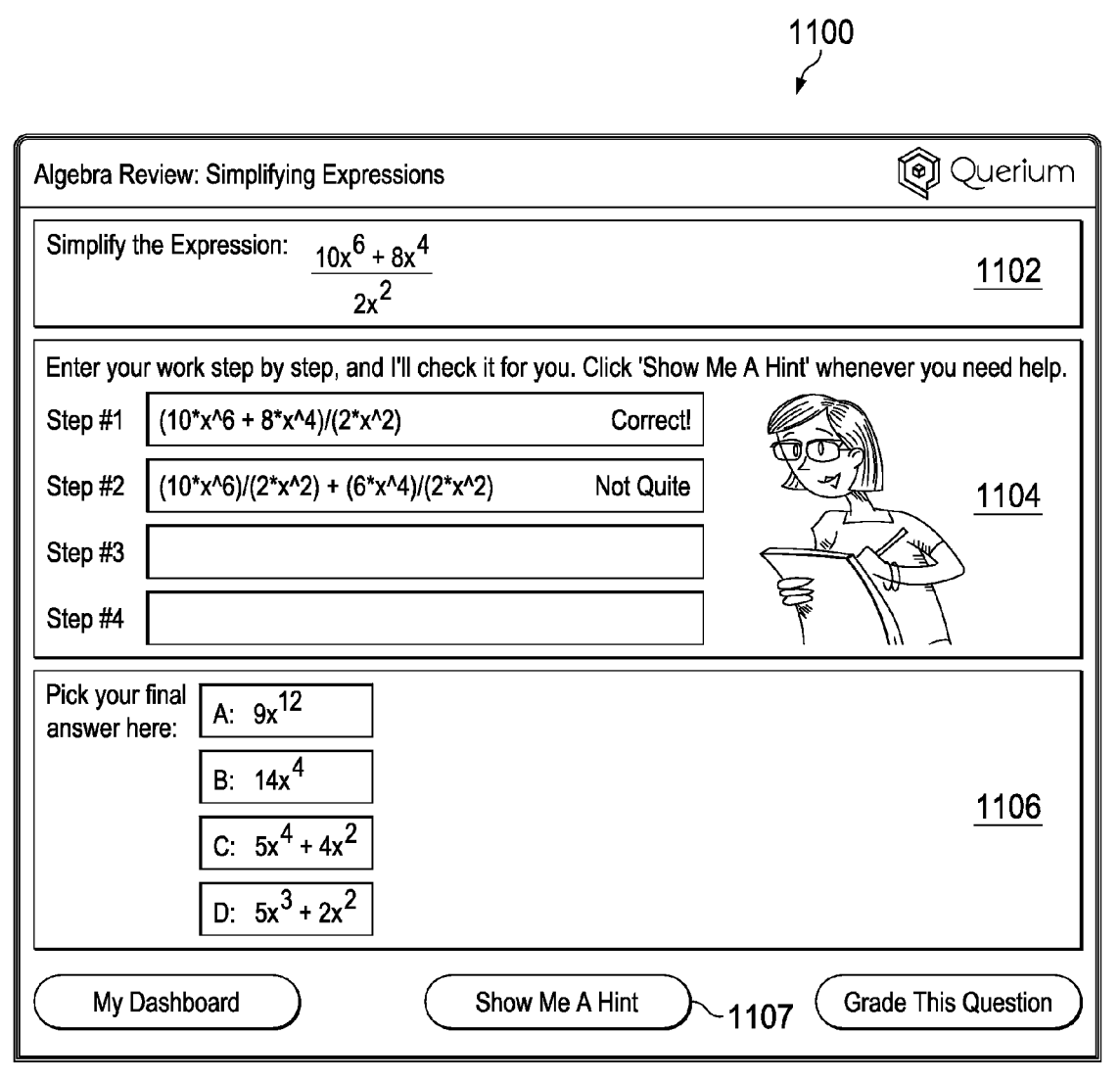

As shown in FIG. 11B, the student may enter a step in solution entry section 1104 and select a control 1108 to check the step (i.e., evaluate it for error). The student may then be allowed to enter a next step in the solution entry section 1104 and likewise check the correctness of the step. If it is not correct, as shown in FIG. 11C, via the designation "Not Quite," the user may be enter a more correct answer.

In addition, the user may select the hint button 1107 to be provided with a hint, such as hint 1110 as shown in FIG. 11D and may then correct his answer. In some embodiments, the student may be allowed to select the hint button 1107 additional times for additional hints. Finally, as shown in FIG. 11E, the correct answer is obtained. The user may then select the correct final answer from section 1106. In some embodiments, if the user needed hints, he may be provided with one or more other question variants before proceeding to a next topic.

In each of the above described expert agent applications, the type of AI technique used may depend on the individual application. For example, a rules-based system could be used for generating false answers for a multiple choice question, whereas a Neural Net could be trained to identify the X and Y axis labels on a variety of samples of bit-mapped images of X-Y plots, or to distinguish a pie chart from a bar chart in a pre-existing question.

Some embodiments of a system disclosed herein may include one or more expert system software (ESS) modules. In some embodiments, a rule-based engine approach might be used or a dictionary-based system might be used. For example, in creating a set of plausible constraints for a DQT variable, a dictionary might be created for associating a word like 'Temp', 'Temperature', 'Kelvin', 'DegreesF', etc. with plausible ranges of values for temperature items. A rule-based engine for generating plausible incorrect answers for a multiple choice question could contain rules of the form, for instance, 'Students often forget to negate some term in an equation, so remove one minus sign from the correct equation and see what value gets generated for this modified equation.' A value thus generated could be suggested as one incorrect answer for a multiple choice question. Another example rule might be 'Perform multiplication and addition operations in the wrong order by ignoring parentheses in an equation.'

In cases where it is known that a student gave an incorrect answer, but the sequence of steps the student produced in generating that answer is not known, an ESS module may implement a technique like fuzzy logic to investigate probable mistakes they made in answering the question, and give hints that express the uncertainty, for example, "You probably forgot to multiply terms before adding terms." As another example, an ESS module may implement a neural network technique and be trained to recognize different types of images. In this way, the ESS module may offer better suggestions about an image that accompanies a question. For example, for a question that uses the phrase 'pie chart', the ESS module can use a specially trained neural network that classifies images according to what type of chart they might be (e.g., bar chart, pie chart, x/y coordinate chart, etc.), such that it would not suggest a bar chart graphic as an image source for a question about pie charts.

Given a set of mathematical questions that describe a problem in science, technology, engineering or math, an ESS module may suggest a number of questions for students that could be used to demonstrate their mastery of those equations. For example, a DQT author may indication that a question will include one of Maxwell's Equations as part of a DQT. The DQT author may select a type of question they want to generate, and additional information about the question (e.g., designed level of the Barrett Taxonomy of comprehension, etc.). The ESS module could then use the techniques of a skilled question author to generate a set of questions that demonstrate understanding of the topic suggested by the equations. For example, if a question author entered the formula for Newton's law of gravity 'F=G* ((m1*m2)/r^2), an ESS module may examine that equation, determine that it is probably a statement of one of Newton's laws, and suggest a question that requires the student to calculate F for a given set of values for G, m1 and m2, by randomizing the value of 'r' within a range of 'r' values determined by the ESS to be typical for Astronomy questions.

By examining the text of a question and the equation(s) that generate the correct solution, an ESS module may identify one or more elements of the question that could be converted into DQT variables. For example, in the text of a question designed to test a student's understanding of Newton's law of gravitation, and given the above equation, an ESS module may suggest values within the question that might become DQT valuables. Accordingly, if the question states that the mass of a planet is 10^20 kilograms, the ESS module may suggest making the value '10^20' into a DQT variable.

By examining information with the question, and the type and number of DQT variables, an ESS module may suggest possible DQT variable constraints that would generate a number of UQVs desired by a DQT Author. For example, in the above gravity question example, if the ESS module knew that one of the original mass values in the question was '10^20 kilograms', and if that quantity was now a DQT variable, the ESS module might suggest to the DQT author that the constraints on that DQT variable might be values within 3 orders of magnitude of 10^20 kilograms. The ESS module could also use information gleaned from the declared data type of the DQT Variable. For example, knowing that a DQT variable referred to water temperature in degrees Celsius, the ESS module could suggest a DQT constraint value ranging from 0 to 100.

Given the text of the question, an ESS module could suggest possible equations to generate the correct answer to the equation from a library of existing equations, based on keywords in the question, or other facts inferred from the other DQT components. For example, if the text of a question referred to 'planet' and 'gravity', the ESS module could suggest the above equation $F=G*((m1*m2)/r^2)$ as an equation to generate the correct solution to the DQT.

Given the desire to create plausible distractors for a multiple-choice question, an ESS module could use a set of desirability fit criteria to create variants of the correct-answer equations to produce plausible incorrect answers (distractors). For example, using a set of rules or a similar data structure to represent frequent student math or logic errors, the ESS module could suggest that one possible incorrect answer for a multiple choice question be calculated by eliminating the '^2' in the above equation, as though the student had forgotten to square the quantity 'r' in answering the question.

Given knowledge of the equations that produce the correct answer, an ESS module could generate explanation text based on the elements of those equations. For example, knowing the 'F=' equation above, and that the DQT variables are labeled 'Mass1"Mass2', and 'Distance', the ESS module could generate an explanation like "You must determine the values for two Mass quantities, and the Distance."

Given knowledge of the other components of the question, of the differences between the equation that generates the correct answer and the equations that generate incorrect multiple choice questions, or knowledge of any incorrect steps by which the student generated their incorrect answer to the question, or external factors such as a given students history of answering previous questions, an ESS module could generate a customized explanation for the student when they provide an incorrect answer. For example, if the ESS module knows only that the correct answer was '6', but the student answered '2', the ESS could apply a predetermined set of possible incorrect steps to the solution of the above 'F=' equation. Any incorrect equation that generated the student's answer '2' might have been arrived at because the student took the same incorrect step. The ESS module might also have access to the intermediate steps taken by the student to solve the problem, and so could use that as additional information. Accordingly, the ESS module could generate a custom explanation for the incorrect answer, e.g., "Your answer was incorrect because you failed to square the value 'r' in the equation."

Given knowledge of the other components of the question, of the differences between the equation that generates the correct answer and the equations that generate incorrect multiple choice questions, or knowledge of the steps by which the student generated their answer to the question, or external factors such as a given students history of answering previous questions, an ESS module could generate a customized hint for the student. As with the above examples, the ESS module could generate hints rather than providing a full explanation.

Given the equations used to produce the correct answer, plus knowledge of other components of the DQT, an ESS module could suggest a customized or uncustomized image to accompany the question. A customized image could include specific information for the DQT variables with their unique values from the UQV. For example, the ESS module could include a library of clip-art images of various science, technology, engineering, and math elements. Each element might have associated keywords to assist the DQT author or the ESS module in searching for elements to use. Each image might or might not be annotated with various dimensions or tags which indicate where dimensions might go in the image (e.g., the measure along one side of a right triangle, or the symbol indicating the value of an angle between two vectors, etc.). The ESS module could then annotate the image with the unique values of the DQT variables.

In a testing system, an ESS module may be configured for grading student answers. The ESS module may make decisions about grading questions, including offering partial credit for some questions. For example, the ESS module may recognize the phrase "The answer is", or "answer?" or "I think it's" and use that knowledge to parse free-response answers.

For a testing system with a touch-based user interface, an ESS module may leverage existing software to recognize hand-drawn numbers, letters and math symbols, and convert handwritten characters to text. Specifically, in some embodiments, an ESS module may leverage the touch interface technology to recognize higher-level constructs used in student answers, such as a student's hand-drawn diagrams or X-Y plots or chemical equations, or hand-written gestures used to answer questions (e.g., a check mark drawn next to the correct item among several possible answers, or a hand drawn circle around an equation to indicate some answer elements that a student would like to evaluate as their answer or as their next step in a multi-step solution) and determine whether the student's answer sufficiently demonstrates the student's mastery of the subject matter being tested.

Some embodiments of an ESS module disclosed herein may be implemented using Software as a Service (SaaS) technology. The functionality of the ESS module described above may be delivered in real time using to users across various platforms and types of devices, including mobile devices such as smart phones, tablets, laptop computers, etc. Some embodiments of an ESS module disclosed herein may be implemented as a mobile application. Some embodiments of an ESS module disclosed herein may be implemented as a cloud based application. Communications between an ESS module and an end user may be conducted over a secure network connection as known to those skilled in the art. Various access control measures may also be used.

Figure 12:
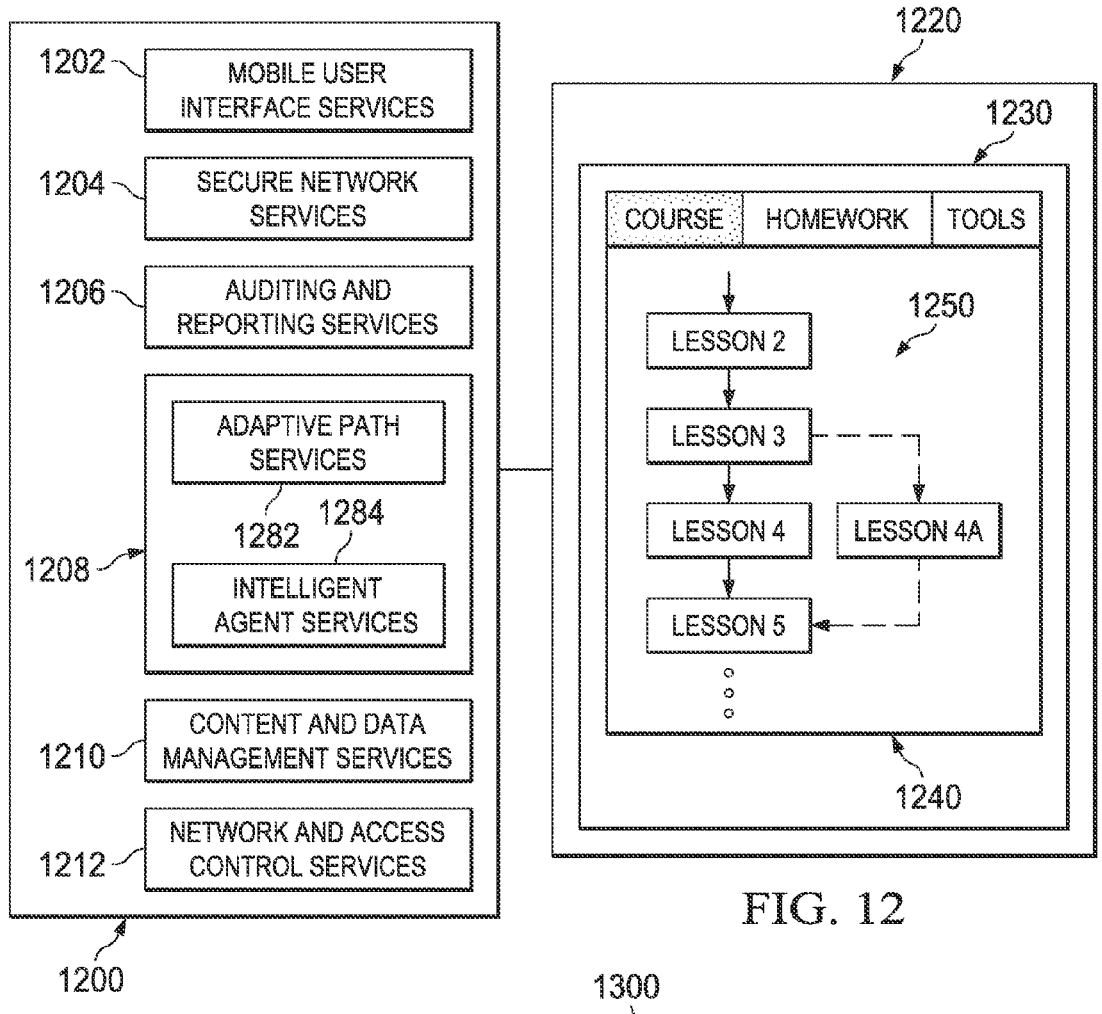
FIG. 12 depicts a diagrammatic representation of one example of an expert system for dynamic assessment according to some embodiments.

FIG. 12 depicts a diagrammatic representation of a system 1200 communicatively connected to a client device 1220 associated with a user. System 1200 may comprise various components 1202-1212 configured to provide various services to client device 1220. Particularly, system 1200 may comprise an ESS module 1208. In this example, the ESS module 1208 includes adaptive path services 1282 and intelligent agent services 1284. The intelligent agent services 1210 may implement the expert agent described above (e.g., expert agent 422). An example of the operation of the ESS module 1208 is illustrated in FIG. 13.

Figure 13:
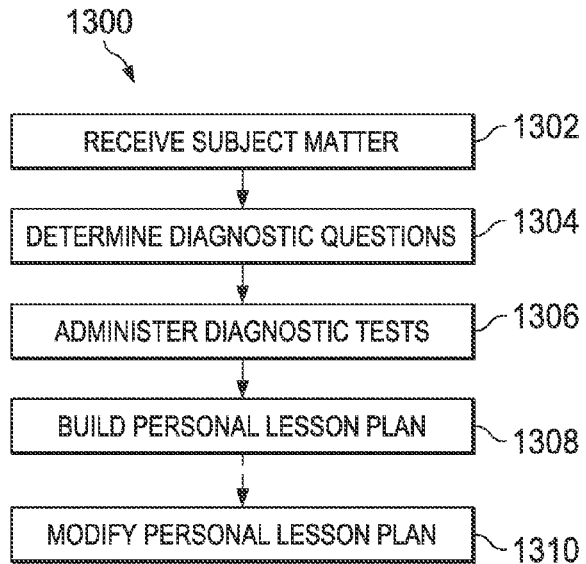
FIG. 13 depicts a flow chart illustrating one example operation of the system of FIG. 12.

Referring to FIG. 13, process 1300 may include receiving, by an ESS module disclosed herein, an indication of a subject matter on which to perform an assessment of a student (step 1302). The ESS module may determine a minimum set of questions (e.g., pre-generated or dynamically generated UQVs described above) for the purpose of diagnose the student's strengths and/or weaknesses relative to the given subject matter (step 1304). In one embodiment, each question is a variant of a DQT described above. The ESS module may generate UQVs from DQT(s) without further input from question author(s). The ESS module may administer the diagnostic questions to the student over a network (step 1306). The administering may include a step-by-step evaluation of the student's performance. The ESS module may automatically and dynamically build a personal lesson plan for the student (step 1308). The personal lesson plan may reflect a learning path or prescription for the individual student on all of the topics that the student has not mastered (as evidenced by the student answering the diagnostic questions incorrectly. The ESS module may modify the personal lesson plan dynamically and adaptively as needed (step 1310).

Returning to FIG. 12, as an example, the client device 1220 may include a display 1230 with a touch interface. A student user (e.g., the student 408 shown in FIG. 4) may use the client device 1220 to take a set of diagnostic tests for a course 1240 (e.g., elementary algebra, intermediate algebra, geometry, statistics, etc.). Responsive to the student selecting the course 1240 (e.g., by clicking on a tab or a button corresponding to the course 1240), the client device 1220 may send a request to the system 1200. As an example, the mobile user interface services 1202 may receive the request and forward the request to the ESS module 1208 via the secure network services 1204 and the auditing and reporting services 1206. Other implementations are also possible (e.g., the mobile user interface services 1202 may communicate the request from the client device 1220 directly to the ESS module 1208). The level of difficulty of a topic may influence the number of diagnostic questions needed to demonstrate a student's mastery of the topic. For example, one diagnostic question may be enough for a straightforward topic such as addition. However, multiple diagnostic questions may be needed to determine if a student has mastered a more difficult topic (e.g., intermediate algebra may be a topic that is more difficult than the topic of addition).

In the example of FIG. 12, the functionality of the ESS module 1208 is implemented in the adaptive path services 1282 and the intelligent agent services 1284. Specifically, the intelligent agent services 1284 may begin with a diagnostic question having a medium level of difficulty on a subject matter. If the student gets it right, the intelligent agent services 1284 may ask a harder question and if that harder question is again answered correctly by the student, the intelligent agent services 1284 may ask an even harder question, and so on. A goal is here is to establish a high watermark of the student's knowledge on the particular topic. On the other hand, if the student gets the medium difficulty question wrong, the intelligent agent services 1284 may give the student an easier question. If the student still gets it wrong, the intelligent agent services 1284 may give the student an even easier question, and so on. A goal is here is to establish a low watermark of the student's knowledge on the particular topic, which can be nothing. In this way, the intelligent agent services 1284 may determine the high and low watermarks of a student's knowledge on a particular subject matter. In one embodiment, the intelligent agent services 1284 may mimic what an expert tutor would do asking a series of questions to determine whether a student knows a topic and/or how well the student knows the topic. The intelligent agent services 1284 may pull questions from the same library (e.g., Object Library 418 shown in FIG. 4), but different sets of questions may be presented to different students, based on an individual's demonstrated knowledge (or the lack thereof).

In some embodiments, each diagnostic question may be particular to a topic on the given subject matter. In some embodiments, the adaptive path services 1282 may make a lesson plan 1250 that reflects an individualized learning path for the particular student based on diagnostic questions that were answered incorrectly (which indicates that the student has not mastered the topic). Each topic that the student has not mastered is included in the personal lesson plan 1250 as a lesson. In some embodiments, each lesson may include a short video, followed by one or more review questions. The personal lesson plan 1250 may be communicated from the system 1200 to the client device 1220. After each diagnostic test, a student may take a lesson to learn the particular topic that they did not know and/or did not do well.

Once a student watched a video and assuming the student gets the review problem(s) right, the adaptive path services 1282 may cause an indicator be displayed to the student, signaling to the student that they have mastered the particular topic and it is time to move on to the next topic. The review problems may be unique variants of the questions that the students had previously answered incorrectly. In one embodiment, at the end of the learning path 1250, the ESS module 1208 may optional give the student a practice final exam.

In some embodiments, the above described process can be a rule based process and based on what is considered the most important topics to learn for the particular subject matter. In this case, the importance of a topic is defined by what would help the particular student to get the most questions right on the test. To this end, the importance of a topic is also defined by what piece of knowledge is the prerequisite of another piece of knowledge. For example, the first question in a diagnostic test may not help a student to answer other questions correctly, but it may help the student to understand a key to get the other questions right (e.g., the correct order of operation to solve a mathematical problem), etc.

At each stage of the personal lesson plan 1250, the adaptive path services 1282 may generate a graph of all the prerequisites of each topic, weigh nodes in the graph (e.g., whether it is covered on the test or not), score their relative importance using, for instance, an algorithm similar to research operation optimization, arrange the nodes based on their scores, and present the node with the highest score as the first lesson. The adaptive path services 1282 may also take into account on whether a topic is going to help the student answer a question on the test, even if that topic is not on the test. For example, a topic may describe how to do additions. The test assumes a student knows how to add, so the topic of addition is not going to be on the test, but it helps the student to answer a question that involves this prerequisite (in this example, the ability to add correctly).

In some embodiments, the personal lesson plan 1250 may be generated upfront and/or dynamically modified. The personal lesson plan 1250 is adaptive in the sense that as the adaptive path services 1282 learn more about a student (e.g., if the student watched a video and still could not answer the question about the topic presented in the video), the adaptive path services 1282 may introduce into the learning path additional lesson or lessons with contents that will provide what the student need (e.g., a prerequisite) in order to do the current lesson. For example, initially, the personal lesson plan 1250 may include lesson 2, lesson 3, lesson 4, lesson 5, and so on. However, the student did not do well on the review questions for lesson 3. The adaptive path services 1282 may dynamically modify the personal lesson plan 1250 and hence the student's learning path to replace lesson 4 with lesson 4A, considered by the adaptive path services 1282 as containing additional information necessary for the student to learn lesson 4, given that the student did not do well on lesson 3.

The ability for the ESS module 1208 to dynamically modify the personal lesson plan 1250 and hence the individual learning path to adapt to a student's progress in learning a subject matter can be useful in formative assessment. The goal of formative assessment is to monitor student learning to provide ongoing feedback that can be used by instructors to improve their teaching and by students to improve their learning. More specifically, formative assessments can help students identify their strengths and/or weaknesses and target areas that need work. In this case, the ESS module 1208 can recognize where students are struggling and address problems immediately, without having to involve instructors. As explained above, the ESS module 1208 may assist the student by offering customized hints to help solving a problem. These hints may be dynamically generated relative to the context of the problem as well as the particular student's work in trying to solve the problem and/or the incorrect answer(s) from the student.

An assessment may be created in an automated or semi-automated manner. In some embodiments, the ESS module 1208 may create a formative assessment based on predefined rules. For example, a rule may define formulations, variables, and constraints necessary to demonstrate mastery of Maxwell's equations. The ESS module 1208 may operate to search DQTs that satisfy the rule, generate UQVs, and create a test for a student based on the UQVs. In some embodiments, the ESS module 1208 may create a minimum number of questions sufficient to test the knowledge of the student on the subject matter. In some embodiments, the ESS module 1208 may assist an instructor to author an assessment by finding DQTs pertinent to a particular subject matter and suggesting and/or generating UQVs based on the DQTs. Examples of formative assessments include asking students to draw a diagram to represent their understanding of a topic.

In some embodiments, the ESS module 1208 may allow students to write math equations and/or draw diagrams with their fingertips and turn their scribbles into math. To this end, the touch interface 1230 may serve as a virtual scratch paper where a student can write whatever they want with their finger (touch data) and indicate to the ESS module 1208 that one of their scribbles (a selected area on the touch interface 1230) is to be evaluated as the next step in their solution. The touch interface 1230 may capture the touch data and/or the indicated area and communicate same to the ESS module 1208. The ESS module 1208 may operate to convert a hand drawn scribble into a math equation and/or a graph (for instance, using a third party math recognition software), making the distinction between what is random writing on their virtual scratch paper (where all their work is captured) and what is their next step to be evaluated (the piece they declare as important). In other words, the math recognition software may recognize math symbols, numbers, etc. and translate the hand drawn scribble into a structured math representation. The ESS module 1208 determines the context of the structured math representation.

Specifically, the ESS module 1208 may operate to interpret the math equation and/or the graph relative to the question being asked and how the student's answer (a particular scribble indicated on the touch interface 1230) ties into the problem the student is trying to solve. For example, the ESS module 1208 may determine whether the student's hand drawn scribble follows a previous step or steps (does not have to be the immediate previous step, e.g., in part follows an immediate previous step and in part follows four steps ago). In some embodiments, the ESS module 1208 may apply its knowledge and/or rules to determine what logical inference allows the student to write the particular step.

As an example, in a rule based implementation of the ESS module 1208, a first rule may specify that, if a graph has a first line that is a straight line and that extends up and down and a second line that is a straight line and that extends left and right, and if the first line and the second line intersects at some point, they are likely to be drawing a Cartesian coordinate system. A second rule may reference the first rule and further specify that, if a third line is drawn there and the third line is a straight line, determine the slope of the third line relative to the first line and the second line. A third rule may reference the first rule and further specify that, if a third line is in there and the third line is a U shaped curve, the third line is an upward parabola in a Cartesian coordinate system. Based on these rules, the ESS module 1208 can make an inference of what is drawn and determine whether the student's drawing represents the function given in the question and hence whether the student has correctly answered the question asked. As those skilled in the art will appreciate, there are varieties of AI techniques, some of which may be better at solving certain types of questions. Thus, embodiments of the ESS module 1208 may implement various AI systems and need not be solely rule based systems.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:
1. A method for dynamic assessment, comprising:
receiving, by an expert system software (ESS) module embodied on non-transitory computer memory, an indication of a subject matter on which to perform an assessment of a student of a plurality of students;
the ESS module determining and administering over a network a minimum set of diagnostic questions to the student relative to the given subject matter,
each diagnostic question in the minimum set of diagnostic questions computed dynamically by the ESS module specifically for each of the plurality of students such that different students of the plurality of students are associated with different minimal sets of diagnostic questions,
each diagnostic question of the minimum set of diagnostic questions being a unique question variant (UQV) generated from a dynamic question template (DQT),
the UQV being one of a plurality of UQVs generated utilizing the DQT,
the DQT having a question, question variables, and question constraints, with or without a correct answer, wherein the ESS module determines the number of UQVs that can be generated using the question constraints and wherein the ESS module determines whether the question constraints will produce valid UQVs,
each of the plurality of UQVs comprising a unique variation of question text incorporating a unique combination of values for the question variables as constrained by the question constraints,
at least one or more of the UQVs computed responsive to the student's range of knowledge on one or more topics on the given subject matter,
wherein the UQV generated from the DQT is unique from the other UQVs generated from a DQT for other students;
based on a step-by-step analysis of the student's answers to the minimum set of diagnostic questions, the ESS module determining which topic for the given subject matter that the student has not mastered;
the ESS module automatically and dynamically building a personal lesson plan for the student, the personal lesson plan including a set of lessons, each relating to a topic of the one or more topics on the given subject matter that the student has not mastered; and
the ESS module presenting the personal lesson plan to the student on a client device communicatively connected to the computer over a network connection;
wherein each diagnostic question of the diagnostic questions requires student work comprising multiple intermediate steps and wherein the ESS module further performs:
determining the multiple intermediate steps of student work required to solve each diagnostic question of the diagnostic questions;
requiring the student to show their work on the multiple intermediate steps in answering each diagnostic question;
evaluating the work of the student step by step via the step-by-step analysis; and
determining whether one or more subsequent diagnostic questions are necessary in the assessment of the student relative to the given subject matter and, if so, determining the one or more subsequent diagnostic questions.

2. The method according to claim 1, further comprising: dynamically modifying the personal lesson plan to change or add at least one lesson considered by the ESS module as necessary for the student to master the subject matter.

3. The method according to claim 1, wherein the administering the diagnostic questions to the student further comprises:
given an equation or equations used to produce a correct answer to a first diagnostic question of the diagnostic questions, the ESS module generating an image and presenting the image with the first diagnostic question to the student.

4. The method according to claim 3, wherein the image is customized to include specific information for DQT variables with unique values for the UQV.

5. The method according to claim 1, wherein the administering the diagnostic questions to the student further comprises:
the ESS module generating at least one customized hint for the student to answer a first diagnostic question of the diagnostic questions based at least on the ESS module's knowledge of components of the first diagnostic question of the diagnostic questions; and
causing the at least one customized hint to be displayed on the client device.

6. The method according to claim 5, wherein the at least one customized hint for the student is generated by the ESS module based additionally on the ESS module's knowledge of steps by which the student generated an answer to the first diagnostic question of the diagnostic questions.

7. The method according to claim 1, wherein the administering the diagnostic questions to the student further comprises:
the ESS module generating a customized explanation for a first diagnostic question of the diagnostic questions when the student provides an incorrect answer to the first diagnostic question of the diagnostic questions.

8. The method according to claim 7, wherein the customized explanation for the first diagnostic question of the diagnostic questions is generated based on elements of equations in the first diagnostic question of the diagnostic questions.

9. The method according to claim 1, wherein the ESS module is configured with formal logic rules, wherein the multiple steps comprise logic proof steps, and wherein the ESS module evaluates the student's work on the logic proof steps using the logic rules.

10. A system for dynamic assessment, comprising: at least one processor; and
at least one non-transitory computer readable medium storing instructions translatable by the at least one processor to implement an expert system software (ESS) module, the ESS module performing:
receiving, by the ESS module, an indication of a subject matter on which to perform an assessment of a student of a plurality of students;
determining and administering over a network a minimum set of diagnostic questions to the student relative to the given subject matter, each diagnostic question in the minimum set of diagnostic questions computed dynamically by the ESS module specifically for each of the plurality of students, such that different students of the plurality of students are associated with different minimal sets of diagnostic questions,
each diagnostic question of the minimum set of diagnostic questions being a unique question variant (UQV) generated from a dynamic question template (DQT), the UQV being one of a plurality of UQVs generated utilizing the DQT; the DQT having a question, question variables, and question constraints, with or without a correct answer, wherein the ESS module determines the number of UQVs that can be generated using the question constraints and wherein the ESS module determines whether the question constraints will produce valid UQVs,
each of the plurality of UQVs comprising a unique variation of question text incorporating a unique combination of values for the question variables as constrained by the question constraints,
at least one or more of the UQVs computed responsive to the student's range of knowledge on one or more topics on the given subject matter,
wherein the UQV generated from the DQT is unique from other UQVs generated from a DQT for other students;
based on a step-by-step analysis of the student's answers to the minimum set of diagnostic questions, the ESS module determining which topic for the given subject matter that the student has not mastered;
the ESS module automatically and dynamically building a personal lesson plan for the student, the personal lesson plan including a set of lessons, each relating to a topic of the one or more topics on the given subject matter that the student has not mastered; and
the ESS module presenting the personal lesson plan to the student on a client device over a network connection;
wherein each diagnostic question of the diagnostic questions requires student work comprising multiple intermediate steps and wherein the ESS module further performs:
determining the multiple intermediate steps of student work required to solve each diagnostic question of the diagnostic questions;
requiring the student to show theft work on the multiple intermediate steps in answering each diagnostic question:
evaluating work of the student step by step via the step-by-step analysis; and
determining whether one or more subsequent diagnostic questions are necessary in the assessment of the student relative to the given subject matter and, if so, determining the one or more subsequent diagnostic questions.

11. The system of claim 10, wherein the ESS module further performs:
dynamically modifying the personal lesson plan to change or add at least one lesson considered by the ESS module as necessary for the student to master the subject matter.

12. The system of claim 10, wherein the administering the diagnostic questions to the student further comprises:
given an equation or equations used to produce a correct answer to a first diagnostic question of the diagnostic questions, the ESS module generating an image and presenting the image with the first diagnostic question to the student.

13. The system of claim 12, wherein the image is customized to include specific information for DQT variables with unique values for the UQV.

14. The system of claim 10, wherein the administering the diagnostic questions to the student further comprises:

the ESS module generating at least one customized hint for the student to answer a first diagnostic question of the diagnostic questions based at least on the ESS module's knowledge of components of the first diagnostic question of the diagnostic questions; and causing the at least one customized hint to be displayed on the client device.

15. The system of claim 14, wherein the at least one customized hint for the student is generated by the ESS module based additionally on the ESS module's knowledge of steps by which the student generated an answer to the first diagnostic question of the diagnostic questions.

16. The system of claim 10, wherein the administering the diagnostic questions to the student further comprises:

the ESS module generating a customized explanation for a first diagnostic question of the diagnostic questions when the student provides an incorrect answer to the first diagnostic question of the diagnostic questions.

17. The system of claim 16, wherein the customized explanation for the first diagnostic question of the diagnostic questions is generated based on elements of equations in the first diagnostic question of the diagnostic questions.

18. The system of claim 10, wherein the ESS module is configured with formal logic rules, wherein the multiple steps comprise logic proof steps, and wherein the ESS module evaluates the student's work on the logic proof steps using the logic rules.

19. A computer program product comprising at least one non-transitory computer readable medium storing instructions translatable by at least one processor to implement an expert system software (ESS) module, the ESS module performing:

receiving an indication of a subject matter on which to perform an assessment of a student of a plurality of students;

determining and administering over a network a minimum set of diagnostic questions to the student relative to the given subject matter, each diagnostic question in the minimum set of diagnostic questions computed dynamically by the ESS module specifically for each of the plurality of students, such that different students of the plurality of students are associated with different minimal sets of diagnostic questions, each diagnostic question of the minimum set of diagnostic questions being a unique question variant (UQV) generated from a dynamic question template (DQT), the UQV being one of a plurality of UQVs generated utilizing the DQT, the DQT having a question, question variables, and question constraints, with or without a correct answer, wherein the ESS module determines the number of UQVs that can be generated using the question constraints and wherein the ESS module determines whether the question constraints will produce valid UQVs, each of the plurality of UQVs comprising a unique variation of question text incorporating a unique combination of values for the question variables as constrained by the question constraints, at least one or more of the UQVs computed responsive to the student's range of knowledge on one or more topics on the given subject matter, wherein the UQV generated from the DQT is unique from other UQVs generated from a DQT for other students;

based on a step-by-step analysis of the student's answers to the minimum set of diagnostic questions, the ESS module determining which topic for the given subject matter that the student has not mastered;

the ESS module automatically and dynamically building a personal lesson plan for the student, the personal lesson plan including a set of lessons, each relating to a topic of the one or more topics on the given subject matter that the student has not mastered; and presenting the personal lesson plan to the student on a client device over a network connection;

wherein each diagnostic question of the diagnostic questions requires student work comprising multiple intermediate steps and wherein the ESS module further performs:

determining the multiple intermediate steps of student work required to solve each diagnostic question of the diagnostic questions;

requiring the student to show their work on the multiple intermediate steps in answering each diagnostic question;

evaluating the work of the student step by step via the step-by-step analysis; and determining whether one or more subsequent diagnostic questions are necessary in the assessment of the student relative to the given subject matter and, if so, determining the one or more subsequent diagnostic questions.

20. The computer program product of claim 19, wherein the ESS module further performs:

dynamically modifying the personal lesson plan to change or add at least one lesson considered by the ESS module as necessary for the student to master the subject matter.

21. The computer program product of claim 19, wherein the administering the diagnostic questions to the student further comprises:

given an equation or equations used to produce a correct answer to a first diagnostic question of the diagnostic questions, the ESS module generating an image and presenting the image with the first diagnostic question to the student.

22. The computer program product of claim 21, wherein the image is customized to include specific information for DQT variables with unique values for the UQV.

23. The computer program product of claim 19, wherein the administering the diagnostic questions to the student further comprises:

the ESS module generating at least one customized hint for the student to answer a first diagnostic question of the diagnostic questions based at least on the ESS module's knowledge of components of the first diagnostic question of the diagnostic questions; and causing the at least one customized hint to be displayed on the client device.

24. The computer program product of claim 23, wherein the at least one customized hint for the student is generated by the ESS module based additionally on the ESS module's knowledge of steps by which the student generated an answer to the first diagnostic question of the diagnostic questions.

25. The computer program product of claim 19, wherein the administering the diagnostic questions to the student further comprises:

the ESS module generating a customized explanation for a first diagnostic question of the diagnostic questions when the student provides an incorrect answer to the first diagnostic question of the diagnostic questions.

26. The computer program product of claim 25, wherein the customized explanation for the first diagnostic question of the diagnostic questions is generated based on elements of equations in the first diagnostic question of the diagnostic questions.

27. The computer program product of claim 19, wherein the ESS module is configured with formal logic rules taken from the field of discrete mathematics, wherein the multiple steps comprise logic proof steps, and wherein the ESS module evaluates the student's work on the logic proof steps using the logic rules.

\* \* \* \* \*